US012762572B2

(12) United States Patent
Hajizadeh et al.

(10) Patent No.: US 12,762,572 B2
(45) Date of Patent: Oct. 13, 2026

(54) INTELLIGENT PROCESSING OF RETURNS

(71) Applicant: United Parcel Service of America, Inc., Atlanta, GA (US)

(72) Inventors: Sanaz Hajizadeh, Atlanta, GA (US); Mark Geller, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 19/065,665

(22) Filed: Feb. 27, 2025

(65) Prior Publication Data

US 2025/0292263 A1 Sep. 18, 2025

Related U.S. Application Data

(60) Provisional application No. 63/566,057, filed on Mar. 15, 2024.

(51) Int. Cl.
*G06Q 30/016* (2023.01)
*G06Q 30/0601* (2023.01)

(52) U.S. Cl.
CPC ....... *G06Q 30/016* (2013.01); *G06Q 30/0633* (2013.01)

(58) Field of Classification Search
CPC ............. G06Q 30/016; G06Q 30/0633; G06Q 30/0185; G06Q 10/0837
See application file for complete search history.

(56) References Cited

U.S. PATENT DOCUMENTS

| | | | | |
|---|---|---|---|---|
| 9,697,548 | B1 | 7/2017 | Jaff et al. | |
| 9,773,269 | B1 * | 9/2017 | Lazarus | G06F 21/00 |
| 2018/0096298 | A1 * | 4/2018 | Twizeyimana | G06F 3/0484 |
| 2018/0174142 | A1 * | 6/2018 | Payne | G06Q 30/06 |
| 2018/0349846 | A1 * | 12/2018 | Sever | G06Q 30/0641 |
| 2019/0188732 | A1 | 6/2019 | Hill | |
| 2020/0045538 | A1 * | 2/2020 | Dattawadkar | H04L 9/50 |
| 2020/0151735 | A1 * | 5/2020 | Patil | G06Q 30/0185 |
| 2026/0074904 | A1 * | 3/2026 | Treiser | H04L 9/3213 |

OTHER PUBLICATIONS

Extended European Search Report received for European Patent Application No. 25161737.9, mailed on Jul. 10, 2025, 11 pages.

* cited by examiner

*Primary Examiner* — Rutao Wu
(74) *Attorney, Agent, or Firm* — Shook, Hardy & Bacon L.L.P.

(57) ABSTRACT

In general, various embodiments of the present disclosure provide systems, methods, apparatuses, and technologies, and/or the like for processing items for a return. Particular embodiments of the disclosure involve processing the items for a return by verifying that surrendered items for the return are in fact authorized items for the return through the use of digital item catalogues and/or pattern recognition solutions. In addition, particular embodiments of the disclosure involve processing the items for a return by verifying that surrendered items for the return are in fact authorized items for the return through the use of image puzzles.

15 Claims, 8 Drawing Sheets

INTELLIGENT PROCESSING OF RETURNS

CROSS REFERENCE TO RELATED APPLICATIONS

This application claims priority from U.S. Provisional Patent Application Ser. No. 63/566,057, filed Mar. 15, 2024, the disclosure of which is hereby incorporated herein by reference in its entirety.

TECHNICAL FIELD

The present disclosure is generally related to data processing and a corresponding computer apparatus designed for and utilized in providing a novel solution for processing returns.

BACKGROUND

Electronic commerce (e-commerce) has become a primary vehicle for many entities, such as businesses and individuals, to sell goods and services due to the increased accessibility of the Internet. E-commerce provides a way for an entity to reach an almost limitless number of customers. However, many entities must rely on an intermediary, such as a shipping provider like United Parcel Service, to get purchased goods to customers. In addition, these entities often rely on intermediaries to facilitate returns.

Conventional processes for returning items that have been purchased from an e-commerce entity through an intermediary can present many technical challenges. For example, an item bought through an e-commerce entity is often return via a process that involves the individual who has purchased the item from the entity's website visiting the website to initiate the return. The individual may receive some type of identification data for the return (e.g., a return identifier) that can then be used by an intermediary who receives the returned item to ship back to the entity. The individual may bring the item to a location of the intermediary or the intermediary may pick up the item from the individual at the individual's residence. The intermediary may then use the identification data in processing the returned item for shipping the item back to the entity. For example, the intermediary may use the identification data in identifying an address for shipping the returned item to, identifying that the correct item is being returned, identifying a charge for shipping the returned item, and/or the like.

However, this process for returning items through an intermediary can present significant technical challenges for the intermediary, as well as the e-commerce entity. The intermediary often accepts many different items (e.g., thousands of items) involved in returns for many different e-commerce entities (e.g., thousands of e-commerce entities). As a result, personnel for the intermediary who is accepting returned items cannot reasonably be expected to know (recognize) all the different items that are returned through the intermediary. Although the personnel can use the identification data provided from the entity in processing the items for return to assist in identifying that the correct items are being returned, nefarious individuals often will commit fraud by providing a counterfeit item that looks similar to the correct item that is to be returned, but may be of a lessor or inferior quality. This problem can be especially prevalent for clothing items where a nefarious individual may provide a clothing item that has the same attributes, such as the same type of clothing item (e.g., t-shirt, pants, sweater, etc.), same color, etc., as the correct clothing item that is to be returned, but is of a lesser/inferior quality.

Further, conventional return processes can present an intermediary with additional technical challenges in detecting fraudulent returns due to the volume of returns that are required to be processed for many different entities. Personnel for the intermediary are expected to accept returned items in a short, timely manner so that the volume of returned items can be quickly processed to provide efficiency, and optimal customer service. As a result, personnel are often heavily reliant on the identification data and the intermediary's returns computing system in providing the speed at which they are expected to process returned items. In addition, the intermediary's returns computing system must be able to recognize items that can be returned from many different entities to detect fraud, which can present significant technical challenges in configuring such a system. As a result, such technical challenges can exacerbate the problem of an intermediary accepting fraudulent items in processing returns. Accordingly, various embodiments of the disclosure provided herein address such technical challenges.

SUMMARY

This summary is intended to introduce a selection of concepts in a simplified form that is further described below in the detailed description section of this disclosure. This summary is not intended to identify key or essential features of the claimed subject matter, nor is it intended to be used as an aid in isolation to determine the scope of the claimed subject matter.

In general, various embodiments of the present disclosure provide methods, apparatuses, systems, computing devices, computing entities, and/or the like for processing items surrendered for a return. In various aspects of the disclosure, a method is provided that comprises: receiving, by computing hardware via a scan of a first barcode, return data that identifies an authorized item that is to be returned to an entity; accessing, by the computing hardware and based at least in part on the return data, a digital items catalogue for the entity, wherein the digital items catalogue comprises a data source for recognizing item identifiers for items associated with the entity; receiving, by the computing hardware via a scan of a second barcode associated with a surrendered item, an item identifier for the surrendered item; comparing, by the computing hardware, the item identifier with the digital items catalogue for the entity; determining, by the computing hardware and based at least in part on comparing the item identifier with the digital items catalogue, that the surrendered item cannot be verified as the authorized item that is to be returned to the entity; and responsive to determining that the surrendered item cannot be verified as the authorized item: accessing, by the computing hardware, images of items associated with the entity; fetching, by the computing hardware and from the images of items, a set of images, wherein the set of images comprises an image of the authorized item and images of other items associated with the entity; generating, by the computing hardware and from the set of images, an image puzzle, wherein the image puzzle comprises each of the images found in the set of images; causing, by the computing hardware, display of the image puzzle on a computing device, wherein display of the image puzzle requests a selection of the image of the authorized item found in the image puzzle; receiving, by the computing hardware and from the computing device, the selection of the image of the authorized item found in the image puzzle;

verifying, by the computing hardware and based at least in part on receiving the selection of the image of the authorized item, that the surrendered item is the authorized item that is to be returned to the entity; and responsive to verifying that the surrendered item is the authorized item, adding, by the computing hardware, a return of the authorized item to a digital return cart.

In some embodiments, fetching the set of images comprises: selecting, from the images of items, images of items that have been returned to the entity within a certain period of time to generate a set of images of returned items; selecting, from the set of images of returned items, images of items associated with a season that is associated with the authorized item to generate a set of images of seasonal items; excluding, from the set of images of seasonal items, images of items having one or more similar attributes with the authorized item to generate a set of images of dissimilar items; and selecting, from the set of images of dissimilar items and based at least in part of a number of items that is to be returned to the entity along with the authorized item, the set of images. In some embodiments, the method further comprises, prior to receiving the return data on the authorized item via the scan of the first barcode: receiving, by the computing hardware from a computing system associate with the entity, entity data on the return of the authorized item to the entity; generating, by the computing hardware and based at least in part on the entity data, a first digital link between the return and the digital items catalogue for the entity, wherein retrieving the digital items catalogue for the entity is based at least in part on the first digital link.

In some embodiments, the return data identifies a second authorized item that is to be returned to the entity, and the method further comprises: receiving, by the computing hardware via a scan of a third barcode associated with a second surrendered item, a second item identifier for the second surrendered item; comparing, by the computing hardware, the second item identifier with the digital items catalogue for the entity; determining, by the computing hardware and based at least in part on comparing the second item identifier with the digital items catalogue, that the second surrendered item cannot be verified as the second authorized item that is to be returned to the entity; and responsive to determining that the second surrendered item cannot be verified as the second authorized item: updating, by the computing hardware, the set of images to exclude the image of the authorized item to generate an updated set of images, wherein the updated set of images comprises an image of the second authorized item; generating, by the computing hardware and from the updated set of images, an updated image puzzle, wherein the updated image puzzle comprises each of the images found in the updated set of images; causing, by the computing hardware, display of the updated image puzzle on the computing device, wherein display of the updated image puzzle requests a selection of the image of the second authorized item found in the image puzzle; receiving, by the computing hardware and from the computing device, the selection of the image of the second authorized item found in the updated image puzzle; verifying, by the computing hardware and based at least in part on receiving the selection of the image of the second authorized item, that the second surrendered item is the second authorized item that is to be returned to the entity; and responsive to verifying that the second surrendered item is the second authorized item, adding, by the computing hardware, a return of the second authorized item to the digital return cart.

In some embodiments, the return data identifies a second authorized item that is to be returned to the entity, and the method further comprises: receiving, by the computing hardware via a scan of a third barcode associated with a second surrendered item, a second item identifier for the second surrendered item; comparing, by the computing hardware, the second item identifier with the digital items catalogue for the entity; verifying, by the computing hardware and based at least in part on comparing the second item identifier with the digital items catalogue, that the second surrendered item is the second authorized item that is to be returned to the entity; and responsive to verifying that the second surrendered item is the second authorized item, adding, by the computing hardware, a return of the second authorized item to the digital return cart. In some embodiments, the method further comprises submitting, by the computing hardware and based at least in part on the return cart, the return of the authorized item to the entity, wherein submitting the return causes the surrendered item to be shipped to the entity. In some embodiments, submitting the return causes a digital credit to issue to an individual who is associated with the return.

In additional aspects of the disclosure, a system is provided that comprises a computer-readable medium storing instructions and a processing device communicatively coupled to the computer-readable medium. The processing device is configured to execute the instructions and thereby perform operations comprising: receiving return data that identifies an authorized item that is to be returned to an entity; accessing, based at least in part on the return data, a digital items catalogue for the entity; receiving an item identifier for a surrendered item; comparing the item identifier with the digital items catalogue for the entity, wherein the digital items catalogue comprises a data source for recognizing item identifiers for items associated with the entity; determining, based at least in part on comparing the item identifier with the digital items catalogue, that the surrendered item cannot be verified as the authorized item that is to be returned to the entity; and responsive to determining that the surrendered item cannot be verified as the authorized item: fetching a set of images, wherein the set of images comprises an image of the authorized item and images of other items associated with the entity; generating, from the set of images, an image puzzle, wherein the image puzzle comprises each of the images found in the set of images; causing display of the image puzzle on a computing device, wherein display of the image puzzle requests a selection of the image of the authorized item found in the image puzzle; receiving, from the computing device, the selection of the image of the authorized item found in the image puzzle; verifying, based at least in part on receiving the selection of the image of the authorized item, that the surrendered item is the authorized item that is to be returned to the entity; and responsive to verifying that the surrendered item is the authorized item, adding a return of the authorized item to a digital return cart.

In some embodiments, fetching the set of images comprises: selecting images of items that have been returned to the entity within a certain period of time to generate a set of images of returned items; selecting, from the set of images of returned items, images of items associated with a season that is associated with the authorized item to generate a set of images of seasonal items; excluding, from the set of images of seasonal items, images of items having one or more similar attributes with the authorized item to generate a set of images of dissimilar items; and selecting, from the set of images of dissimilar items and based at least in part of a number of items that is to be returned to the entity along with the authorized item, the set of images. In some embodiments, the season comprises at least one of spring, summer, winter, or fall. In some embodiments, the one or more similar attributes comprise at least one of a color or a product name.

In some embodiments, the operations further comprise: receiving a set of item identifiers for a set of the items associated with the entity; determining that the set of item identifiers satisfy a statistical threshold; responsive to determining that the set of item identifiers satisfy the statistical threshold, generating, based at least in part on the set of item identifiers, a pattern recognition solution for the entity, wherein the pattern recognition solution identifies a pattern found within item identifiers for at least one of a particular item, a particular type of item, or a particular category of item for the entity.

In some embodiments, the operations further comprise, prior to receiving the return data on the authorized item: receiving, from a computing system associate with the entity, entity data on the return of the authorized item to the entity; generating, based at least in part on the entity data, a first digital link between the return and the digital items catalogue for the entity, wherein retrieving the digital items catalogue for the entity is based at least in part on the first digital link.

In some embodiments, the return data identifies a second authorized item that is to be returned to the entity, and the operations further comprise: receiving a second item identifier for ta second surrendered item; comparing the second item identifier with the digital items catalogue for the entity; determining, based at least in part on comparing the second item identifier with the digital items catalogue, that the second surrendered item cannot be verified as the second authorized item that is to be returned to the entity; and responsive to determining that the second surrendered item cannot be verified as the second authorized item: updating the set of images to exclude the image of the authorized item to generate an updated set of images, wherein the updated set of images comprises an image of the second authorized item; generating, from the updated set of images, an updated image puzzle, wherein the updated image puzzle comprises each of the images found in the updated set of images; causing display of the updated image puzzle on the computing device, wherein display of the updated image puzzle requests a selection of the image of the second authorized item found in the updated image puzzle; receiving, from the computing device, the selection of the image of the second authorized item found in the updated image puzzle; verifying, based at least in part on receiving the selection of the image of the second authorized item, that the second surrendered item is the second authorized item that is to be returned to the entity; and responsive to verifying that the second surrendered item is the second authorized item, adding a return of the second authorized item to the digital return cart.

In some embodiments, the return data identifies a second authorized item that is to be returned to the entity, and the operations further comprise: receiving a second item identifier for a second surrendered item; comparing the second item identifier with the digital items catalogue for the entity; verifying, based at least in part on comparing the second item identifier with the digital items catalogue, that the second surrendered item is the second authorized item that is to be returned to the entity; and responsive to verifying that the second surrendered item is the second authorized item, adding a return of the second authorized item to the digital return cart.

In additional aspects of the disclosure, a non-transitory computer-readable medium storing computer-executable instructions is provided. The computer-executable instruction that, when executed by computing hardware, configure the computing hardware to perform operations comprising: receiving, via a scan of a first barcode, return data that identifies a return, wherein the return involves an authorized item that is to be returned to an entity; accessing, based at least in part on the return data, a digital items catalogue for the entity from a plurality of digital items catalogues for a plurality of entities, wherein each of the plurality of digital items catalogues comprises a data source for recognizing item identifiers for items associated with the corresponding entity from the plurality of entities; receiving, via a scan of a second barcode associated with a surrendered item, an item identifier for the surrendered item; comparing the item identifier with the digital items catalogue for the entity; verifying, based at least in part on comparing the item identifier with the digital items catalogue, that the surrendered item is the authorized item that is to be returned to the entity; and responsive to verifying that the surrendered item is the authorized item, adding a return of the authorized item to a digital return cart.

In some embodiments, the operations further comprise, for each of the plurality of entities: receiving a set of item identifiers for a set of the items associated with the corresponding entity; determining that the set of item identifiers satisfy a statistical threshold; responsive to determining that the set of item identifiers satisfy the statistical threshold, generating, based at least in part on the set of item identifiers, a pattern recognition solution for the entity, wherein the pattern recognition solution identifies a pattern found within item identifiers for at least one of a particular item, a particular type of item, or a particular category of item for the entity.

In some embodiments, the return involves a second authorized item that is to be returned to the entity, and the operations further comprise: receiving, via a scan of a third barcode associated with a second surrendered item, a second item identifier for the second surrendered item; evaluating the second item identifier using the pattern recognition solution; verifying, based at least in part on evaluating the second item identifier using the pattern recognition solution, that the second surrendered item is the second authorized item that is to be returned to the entity; and responsive to verifying that the second surrendered item is the second authorized item, adding a return of the second authorized item to the digital return cart.

In some embodiments, the operations further comprise submitting, based at least in part on the return cart, the return of the authorized item to the entity, wherein submitting the return causes the surrendered item to be shipped to the entity. In some embodiments, submitting the return causes a digital credit to issue to an individual who is associated with the return.

BRIEF DESCRIPTION OF THE DRAWINGS

The present systems, methods, and apparatuses for are described in detail in connection with the attached drawing figures, which illustrate non-limiting examples of the disclosed subject matter, wherein.

DETAILED DESCRIPTION

Figure 1:
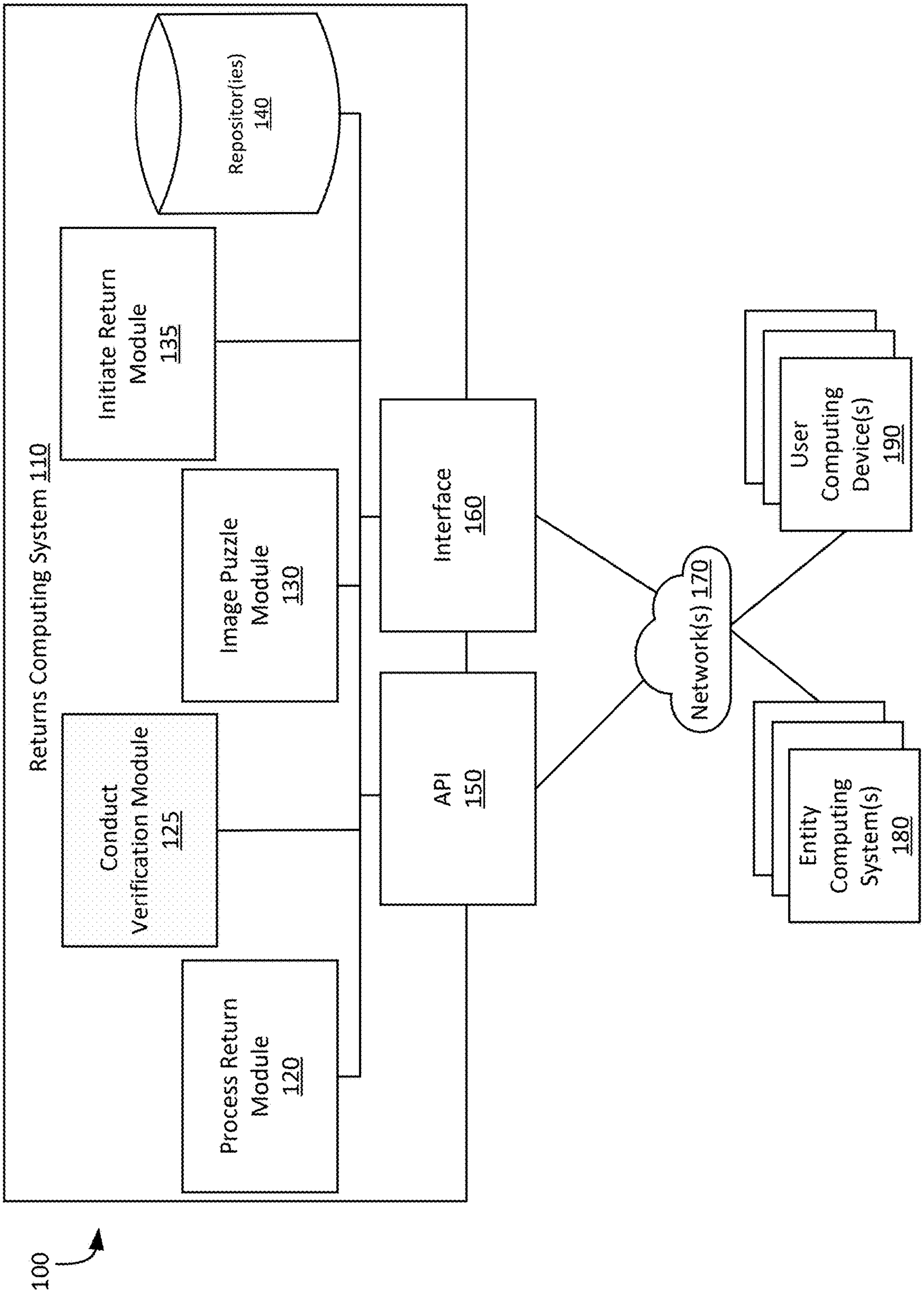
FIG. 1 depicts an example of a computing environment that can be used for processing one or more items for a return in accordance with various embodiments of the present disclosure.

This detailed description is provided in order to meet statutory requirements. However, this description is not intended to limit the scope of the disclosure. Rather, the claimed subject matter may be embodied in other ways, including different steps, different combinations of steps, different operations, different combinations of operations, different elements and/or components, and/or different combinations of elements and/or components, similar to those described in this disclosure and in conjunction with other present or future technologies and solutions. Moreover, although the term "Operation" may be used herein to identify different elements of methods employed, the term should not be interpreted as implying any particular order among or between different elements except when the order is explicitly described as such.

Overview

Electronic commerce (e-commerce) has become a primary vehicle for many entities, such as businesses and individuals, to sell goods and services due to the increased accessibility of the Internet. E-commerce provides a way for an entity to reach an almost limitless number of customers. However, many entities must rely on an intermediary, such as a shipping provider like United Parcel Service, to get purchased goods to customers. For example, when an individual purchases an item through an entity's website, the entity must then ship the purchased item to the individual. Many times, the entity will use an intermediary to ship the item to the individual.

In addition, these entities often rely on intermediaries to facilitate returns. Conventional returns processes generally involve an individual surrendering the one or more items involved in a return to the intermediary for shipping back to an entity. For example, the individual may bring the item(s) to a brick-and-mortar establishment associated with the intermediary to surrender the item(s) to the intermediary to have the item(s) shipped back to the entity. As another example, personnel for the intermediary (e.g., package delivery personnel) may pick up the item(s) from the individual at the individual's residence, place of business, and/or the like.

At that time, personnel for the intermediary may process the item(s) that are to be returned and ensure (e.g., verify) that the surrendered item(s) provided by the individual are the authorized item(s) that are to be returned to the entity. For example, the individual may have initiated the return of the item(s) via a website associated with the entity or the intermediary. As a result, the website may provide the individual with return data that can be used by the personnel of the intermediary in processing the item(s) that are to be returned. For example, the website may provide the individual with a barcode, such as a quick response ("QR") code, that the personnel may scan to process the item(s) that are to be returned. The QR code may provide needed information for processing the item(s) such as an address to ship the item(s) to and/or an identifier of the entity. In addition, the QR code may provide a description of each of the authorized item(s) that is to be returned to the entity that the personnel can use in verifying the surrendered items provided by the individual are the authorized item(s) to be returned to the entity. For example, the authorized item(s) to be returned may be clothing, and the descriptions may provide the number of authorized item(s) that are to be returned, as well as a type of clothing and a color for each authorized item. Therefore, the personnel may review the descriptions and verify that each surrendered item matches a corresponding authorized item that is to be returned to the entity.

However, a nefarious individual will often "switch out" an authorized item that is to be returned to the entity with a "counterfeit" item that may be of a lesser/inferior quality. For example, the individual may switch out a high end (e.g., brand named) clothing item that is authorized to be returned to the entity with a clothing item that looks similar, but is of lesser/inferior quality. As an illustrative example, the authorized item may be a green dress and a nefarious individual may surrender a dress of lesser/inferior quality with similar features such as color and size, and the description for the dress may simply read green dress. The individual may do this so that the individual can receive a refund for the high-end clothing item while still keeping the item for him or herself.

Fraudulent returns can pose a very difficult challenge for personnel of the intermediary to recognize. Personnel are often tasked with processing returns of authorized items for a significant number of entities (e.g., thousands of entities), and cannot reasonably be able to recognize counterfeit items from authorized items for the significant number of entities. Many entities have frequent changes to inventory and/or available items that make it near impossible for personnel of the intermediary to be familiar with all the different items eligible for returns through the different entities. In addition, personnel for the intermediary are often expected to accept, and process returns in a speedy and efficient manner that adds to the difficultly of recognizing fraudulent returns. It can be nearly impossible for personnel to identify many instances of fraud without some type of computer assistance.

Technologies have been developed to assist personnel in identifying fraudulent returns. However, these technologies still leave personnel with many technical challenges in identifying instances of fraud. For example, fraud detection software is available that analyzes return patterns of individuals to identify fraud. These tools can flag suspicious activity, such as high return rates, mismatched purchase history, or returns made for high-ticket items. However, such fraud detection software is generally only helpful in identifying nefarious individuals who engage in frequent fraudulent activities. As a result, many nefarious individuals can evade detection by spacing out returns and/or taking other actions to avoid establishing patterns that identify their fraudulent activities. Other systems are available that can scan receipts for authenticity. However, these system only help to detect counterfeit receipts or returns made without actual purchases. They are not helpful in identifying counterfeit items that are being returned in place of authorized items.

Various embodiments of the present disclosure address these technical challenges by providing a novel returns computing system that improves upon conventional returns computing systems in that the novel returns computing system is configured with capabilities that can quickly, efficiently, and effectively verify surrendered items provided by an individual in connection with a return of authorized items to an entity are in fact the authorized items that are to be returned to the entity. Various embodiments of the novel returns computing system can do so by providing capabilities that allow for automatic verification of surrendered items as being authorized items for a return. Additionally, or alternatively, various embodiments of the novel returns computing system can do so by providing capabilities that assist personnel in verifying surrendered items as being authorized items for a return in a timely and/or efficient manner.

In various embodiments, the returns computing system receives return data that identifies an authorized item that is to be returned to an entity. For example, an individual who wishes to return an item to an entity that he or she purchased through a website of the entity may visit the entity's or intermediary's website to initiate the return of the item. At that time, the website may process and authorize the return of the item. In addition, the website may provide the individual with return data on the authorized item. For example, the website may provide the individual with return data in the form of computer-readable indicia such as a QR code, a matrix barcode, a linear barcode, and/or the like. The return data may include various data needed in shipping and returning the authorized item to the entity.

For example, the return data may include a shipping address for returning the authorized item to the entity. Additionally, or alternatively, the return data may include an identifier for the return (e.g., return identifier). Additionally, or alternatively, the return data may include an identifier for the entity (e.g., an entity identifier). Additionally, or alternatively, the return data may include a description and/or an identifier for the authorized item that is to be returned to the entity. Additionally, or alternatively, the return data may include instructions on how the authorized item should be shipped to the entity, the level of service for shipping the authorized item to the entity, an associated cost of shipping the authorized item to the entity, and/or the like.

The individual may provide the return data at a time when the individual is surrendering the item for return to the entity. As an illustrative example, the individual may visit a brick-and-mortar establishment associated with the intermediary and present the computer-readable indicia to personnel of the intermediary to read (e.g., scan) so that the returns computing system receives the return data. As another illustrative example, personnel of the intermediary may visit the individual's residence and pick up the item for returning the item to the entity. The individual may present the computer-readable indicia to the personnel, who then reads (e.g., scans) the computer-readable indicia so that the returns computing system receives the return data.

In particular embodiments, upon receiving the return data, the returns computing system accesses a digital items catalogue for the entity based at least in part on the return data. For example, the returns computing system may utilize data provided within the return data, such as an entity identifier, in identifying and accessing the digital items catalogue associated with the entity. Additionally, or alternatively, the returns computing system may access data stored within the returns computing system on the return based at least in part the return data. For example, the data stored on the returns computing system for the return may include a digital link to the digital items catalogue. Here, the returns computing system may identify the data stored on the system for the return based at least in part on the return data, and use the digital link provided in the data in accessing the digital items catalogue.

The digital items catalogue may serve as a data source that can be used in recognizing items, as well as corresponding item identifiers, associated with the entity. For example, the digital items catalogue may be configured to allow the returns computing system to perform lookups of item identifiers associated with surrendered items to match them with known item identifiers for authorized items involved in a return.

In some embodiments, the returns computing system may collect item identifiers and/or related information such as images for various items that are associated with (e.g., sold by) the entity in constructing a digital items catalogue for the entity. For example, the returns computing system may access a data source (e.g., one or more databases) within a computing system of the entity to collect item identifiers and/or related information. Additionally, or alternatively, the return computing system may collect the item identifiers and/or related information through other sources such as collecting item identifiers from various items that are sold by an entity as the items are involved in returns and are being surrendered to the intermediary (personnel thereof) in processing the returns.

Additionally, or alternatively, the returns computing system may be configured to generate one or more pattern recognition solutions for an entity. In general, a pattern recognition solution may identify a pattern found/recognized within item identifiers for a particular item, particular type of item, particular category of item, and/or the like for an entity. In some embodiments, the return computing system may, upon receiving a statistically relevant sample size of item identifiers for the particular item, particular type of item, particular category of item, and/or the like, generate a pattern recognition solution based at least in part on the samples of item identifiers.

For example, the return computing system may receive a particular item identifier for the same item that has been accepted as an authorized item over a period of time, although the item identifier is not found in the digital items catalogue for the entity. Here, the return computing system may generate a pattern recognition solution for the item that indicates the particular item identifier is associated with the item. As another example, the return computing system may generate a pattern recognition solution for a type of item (e.g., dress shirts) available through an entity based of a sample of item identifiers collected for the type of item that indicates the item identifiers for this type of item start with "TCT" and have a total of ten characters. In particular embodiments, the generated pattern recognition solution may then serve as another source, e.g., used in conjunction with the digital items catalogue for the entity, for verifying surrendered items are authorized items for returns involving the type of item for the entity. In other embodiments, the generated pattern recognition solution may serve as the sole source for verifying surrendered items are authorized items for returns involving the type of item for the entity.

Continuing with the returns computing system processing the return, the returns computing system may receive an item identifier associated with a surrendered item provided in conjunction with the return. For example, the surrendered item may be a clothing item having some type of computer-readable indicia such as a barcode printed on a tag of the clothing item. Personnel who take possession of the surrendered item may scan the barcode and in turn, the returns computing system may receive an item identifier stored within the barcode.

In particular embodiments, the returns computing system compares the item identifier associated with the surrendered item with the digital items catalogue for the entity. For example, the returns computing system may determine from the return data that a clothing item that has been authorized to be returned is a particular dress shirt sold by the entity. Here, the returns computing system may look up the known item identifier for the dress shirt in the digital items catalogue, and compare the item identifier received for the surrendered item with the known item identifier for the authorized item.

Additionally, or alternatively, the returns computing system may evaluate the item identifier associated with the surrendered item using one or more pattern recognition solutions developed for the entity. For example, the returns computing system may evaluate the item identifier based at least in part on not finding a match for the item identifier with a known item identifier found in the digital items catalogue for the entity. In other instances, the returns computing system may evaluate the item identifier solely using the one or more pattern recognition solutions, without considering a digital items catalogue for the entity.

If the returns computing system determines the two identifiers match, then the returns computing system verifies that the surrendered item received by the personnel is in fact the authorized item that is to be returned to the entity. In particular embodiments, the returns computing system may perform one or more operations as a result of verifying the surrendered item is the authorized item. For example, the returns computing system may provide some type of indication to the personnel such as adding a return of the authorized item to a digital return cart.

The returns computing system may perform the same process for any additional item identifiers received that are associated with additional surrendered items. Once the returns computing system has processed all of the item identifiers received for surrendered items, and has verified that the surrendered items are the authorized items for the return, the returns computing system may perform one or more operations in furtherance of processing the return. For example, the returns computing system may initiate a process to cause the surrendered item(s) to be shipped to the entity. Additionally, or alternatively, the returns computing system may cause a digital credit of a cost (e.g., a refund) of the authorized item(s) to issue to an individual who is associated with the return.

Thus, various embodiments of the returns computing system may address the technical challenges that arise from the lack of capabilities found in conventional returns computing systems in processing returns, and/or detecting fraudulent returns. For example, various embodiments of the returns computing system address such technical challenges by making use of digital items catalogues and/or pattern recognition solutions for different entities in verifying that surrendered items are in fact authorized items to be returned to the entities. Such capabilities found in various embodiments of the returns computing system can allow for verification of surrendered items to be conducted in an automated and/or semi-automated fashion, and provide personnel of intermediaries with a returns process that can be performed in a speedy and efficient manner, while at the same time avoiding fraudulent returns. As such, various embodiments of the returns computing system provide a specific mechanism for accomplishing a process for returning items, as well as a particular practical application for processing returns.

Continuing with various embodiments of the returns computing system, if the returns computing system is unable to verify the surrendered item is the authorized item through use of the digital items catalogue and/or one or more pattern recognition solutions or the surrendered item does not have an item identifier, then the returns computing system provides further functionality to the personnel of the intermediary to assist in doing so. More specifically, various embodiments of the returns computing system provide functionality in a form of an image puzzle that requests the personnel to select the image of an item found in the image puzzle that matches the surrendered item received by the personnel.

Here, the returns computing system accesses images of items associated with (e.g., sold by) the entity, and fetches a set of images that includes an image of the authorized item, along with other images of items associated with the entity. For example, the digital items catalogue for the entity may include images of various items that are associated with (e.g., sold by) the entity and the returns computing system may access the images found in the digital items catalogue.

In some embodiments, the returns computing system may apply certain criteria in selecting the images of the other items that are to be included in the set of images. For example, the returns computing system may apply criteria that involves selecting images of items that have been returned to the entity within a certain period of time, and/or from a certain number of items that have previously been returned. Additionally, or alternatively, the returns computing system may select images of items that are associated with a season that is associated with the authorized item. Additionally, or alternatively, the returns computing system may exclude images of items having one or more similar attributes with the authorized item. Additionally, or alternatively, the returns computing system may select images of items based at least in part of the number of items to be returned to the entity.

The returns computing system uses the set of images in generating an image puzzle that includes each image of an item found in the set of images. For example, the set of images may include nine images of items, and the returns computing system may generate an image puzzle having a layout of a 3×3 matrix. As another example, the set of images may include six images, and the returns computing system may generate an image puzzle having a layout of a 3×2 matrix. Yet, as another example, the set of images may include four images, and the returns computing system may generate an image puzzle having a layout of a 2×2 matrix. In addition, the returns computing system may shuffle the images found in the set of images so that the image of the authorized item is randomly placed into any one of the positions of the matrix.

The returns computing system causes display of the image puzzle on a computing device being used by the personnel. The image puzzle requests the personnel to select the image of the authorized item found in the image puzzle and in turn, the personnel selects one of the images based on the surrendered item received by the personnel for the return. In this way, if the personnel has received a counterfeit item, he or she is unlikely able to select the correct image of the authorized item found in the image puzzle. The returns computing system receives the selection and determines whether the personnel has selected the image of the authorized item found in the image puzzle. If so, then the returns computing system verifies that the surrendered item is in fact the authorized item to be returned to the entity. If the returns computing system determines the personnel has not selected the image of the authorized item, then the returns computing system may inform the personnel of such.

In particular embodiments, the returns computing system may perform one or more operations as a result of verifying, via the image puzzle, that the surrendered item is the authorized item that is to be returned to the entity. For example, the returns computing system may provide some type of indication to the personnel such as adding a return of the authorized item to a digital return cart.

Accordingly, if the returns computing system is unable to verify other surrendered items are authorized items that are involved in the return through use of the digital items catalogue and/or one or more pattern recognition solutions for the entity, then the returns computing system may perform the same process for verifying the other surrendered items via an image puzzle. As previously discussed, once the returns computing system has processed all of the item identifiers received for surrendered items, and has verified that the surrendered items are the authorized items for the return, the returns computing system may perform one or more operations in furtherance of processing the return. Therefore, the returns computing system's use of an image puzzle in various embodiments to assist personnel in ensuring that surrendered items are in fact the authorized items for return helps to address various technical challenges encountered in conventional return systems with processing returns in a timely and/or efficient manner, as well as with detecting fraudulent returns.

Example Computing Environment

FIG. 1 depicts an example of a computing environment 100 that can be used for processing one or more items for a return in accordance with various embodiments of the present disclosure. In various embodiments, the computing environment 100 includes a returns computing system 110 that provides a returns service to entities, such as businesses and/or individuals, to allow for processing of returns through an intermediary who carries out the returns on behalf of the entities. For example, the returns computing system 110 may be associated with a particular package carrier, such as United Parcel Service, the United States Postal Service, and/or the like, who provides return shipping services on behalf of entities to process and ship items involved in returns back to the entities.

The returns computing system 110 may provide the returns service through different mechanisms. In some embodiments, the returns computing system 110 may provide an application programming interface ("API") 150 through which calls can be submitted to initiate returns that are carried out by the intermediary. For example, one or more entity computing systems 180 may integrate computer-implemented functionality for initiating returns for associated entities through the intermediary by installing the API 150 within the entity computing system(s) 180 that can then be used to submit calls initiating returns over one or more networks 170 (e.g., the Internet). As a specific example, an entity computing system 180 for an entity may be hosting a web application such as a website that has the API 150 installed within the website so that the returns service is available to customers (e.g., visitors) who wish to return items purchased on the website and initiate the returns through the intermediary via the returns service. Additionally, or alternatively, the returns computing system 110 may provide APIs 150 that enable the returns computing system 110 to access data sources within the entity computing system(s) 180 so that the returns computing system 110 can collect item identifiers on items associated with (e.g., being offered for sale by) different entities, as well as related information such as images of the items, descriptions of the items, cost of the items, and/or the like.

Additionally, or alternatively, the returns computing system 110 may provide an interface 160 through which individuals can initiate returns of items for various entities through the intermediary. For example, the interface 160 may be a web application that individuals can access through a web browser on their user computing devices 190, such as personal computers, laptops, tablets, mobile devices, and/or the like, to initiate returns over one or more networks 170 (e.g., the Internet, cellular network, etc.). In another example, the interface 160 may be a software application, such as a mobile application, that individuals can install on their user computing devices 190 to initiate returns.

Additionally, or alternatively, the returns computing system 110 may provide an interface 160 through which personnel for the intermediary can initiate and/or process returns for various entities through the intermediary. For example, the interface 160 may be a web application that personnel can access through a web browser on their user computing devices 190 to initiate and/or process returns over one or more networks 170. In another example, the interface 160 may be a software application, such as a desktop or mobile application, that personnel can install on their user computing devices 190 to initiate and/or process returns.

As illustrative example, personnel at a brick-and-mortar establishment may access the returns service through a web application and/or software application installed on their user computing devices 190 so that the personnel can process items for returns brought into the brick-and-mortar establishment by individuals who have initiated the returns for the items. As another illustrative example, personnel who perform pickups for the intermediary may access the returns service through a web application and/or software application installed on their user computing devices 190 so that the personnel can initiate returns for items picked up at individuals' residents, places of business, etc.

In particular embodiments, the returns computing system 110 may execute a process return module 120 to process one or more items for a return. Additionally, or alternatively, the returns computing system 110 may execute a conduct verification module 125 to verify that a surrendered item is an authorized item for a return. Additionally, or alternatively, the returns computing system 110 may execute an image puzzle module 130 to verify, via an image puzzle, that a surrendered item is an authorized item for a return. Additionally, or alternatively, the returns computing system 110 may execute an initiate return module 135 to initiate a return of one or more items for an entity. Accordingly, the returns computing system 110 may include hardware components for executing the process return module 120, the conduct verification module 125, the image puzzle module 130, and/or the initiate return module 135.

Further, in some embodiments, the returns computing system 110 may include and/or access one or more repositories 140. For example, the returns computing system 110 may utilize one or more repositories 140 for storing digital items catalogues and/or pattern recognition solutions for different entities. Additionally, or alternatively, the returns computing system 110 may utilize one or more repositories for storing data on returns of items that are to be conducted through the intermediary. Further detail is now provided regarding the configuration and functionality of the process return module 120, the conduct verification module 125, the image puzzle module 130, and the initiate return module 135 according to various embodiments of the disclosure.

Process Return Module

Figure 2:
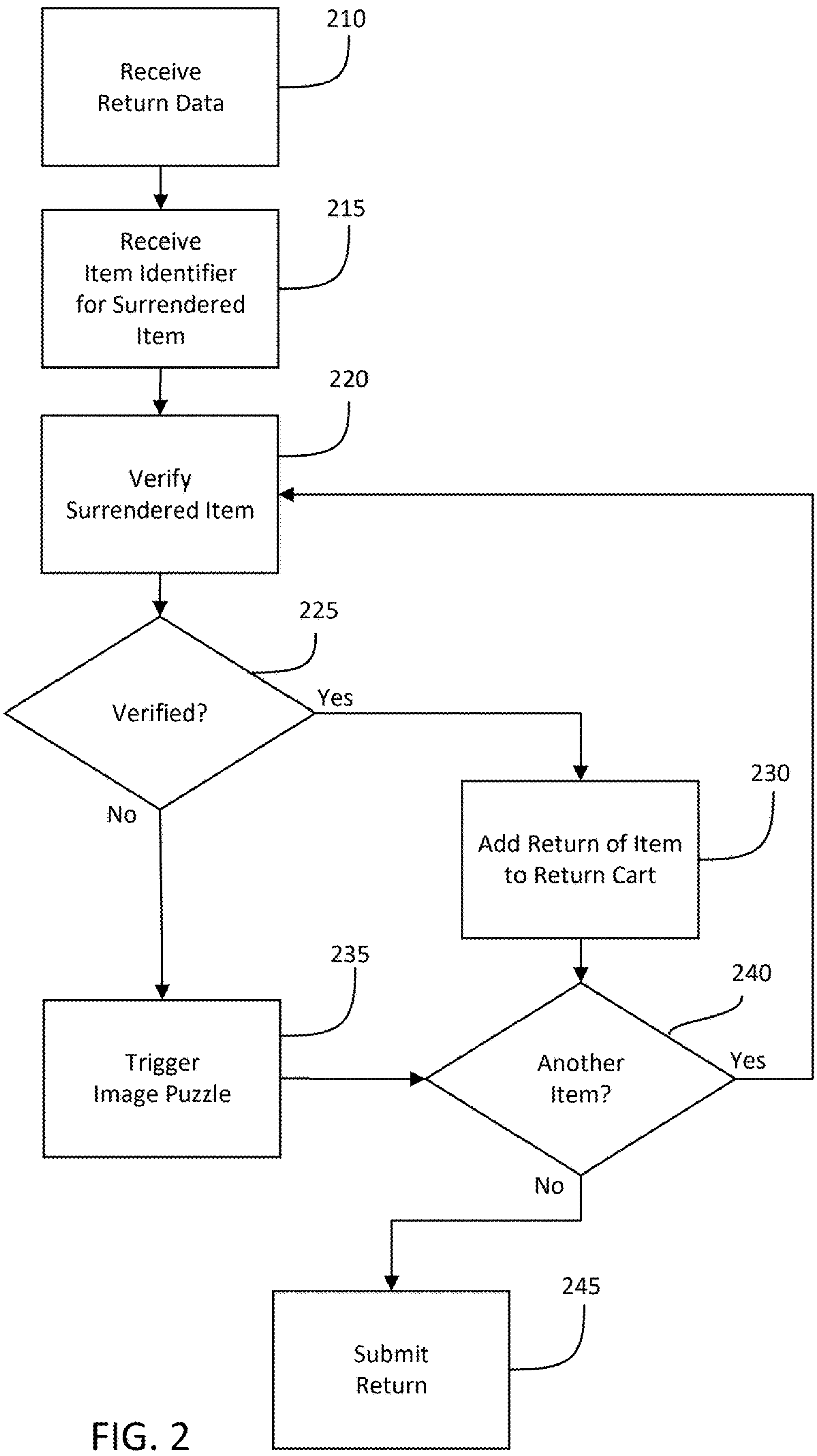
FIG. 2 depicts an example of a process for processing a return in accordance with various embodiments of the present disclosure.

Turning now to FIG. 2, additional details are provided regarding a process return module 120 for processing one or more items for a return in accordance with various embodiments of the disclosure. For instance, the flow diagram shown in FIG. 2 may correspond to operations carried out, for example, by computing hardware found in the returns computing system 110 as described herein, as the computing hardware executes the process return module 120.

The process involves the process return module 120 receiving return data associated with a return of one or more authorized items to an entity at Operation 210. In particular embodiments, the process return module 120 receives the return data based at least in part on an individual who is associated with the return presenting the return data to personnel of an intermediary that is handling the return on behalf of the entity.

For example, the individual may have initiated the return through an interface 160 such as a website provided by the intermediary and/or the entity. At that time, the individual may have identified the one or more items that are to be returned to the entity, and the return of the one or more items may have been authorized. In addition, the interface 160 may have provided the individual with return data in the form of some type of computer-readable indicia, such as a barcode, that may be downloaded to a user computing device 190 and/or printed. Additionally, or alternatively, the interface 160 may facilitate saving additional data on the return to the returns computing system 110. For example, the interface 160 may facilitate saving a digital link between the return and a digital items catalogue for the entity. Such action may help to improve the speed at which the return can be processed when the item is surrendered to personnel of the intermediary since the returns computing system 110 will not have to establish a relationship (e.g., a digital link) between the return and the digital items catalogue at that time.

The individual may then visit a brick-and-mortar establishment associated with the intermediary with the items that are to be returned to the entity. The individual may present the return data (e.g., computer-readable indicia) to personnel who then reads (e.g., scans) the return data into the returns computing system 110. In other instances, personnel for the intermediary may visit the individual at the individual's residence, place of business, and/or the like to collect the items for the return, and the individual may present the return data (e.g., computer-readable indicia) to the personnel, who then reads (e.g., scans) the return data using a user computing device 190 into the returns computing system 110. In some embodiments, upon receiving the returns data, the returns computing system 110 may execute the process return module 120.

Depending on the embodiment, the return data may include various types of data. For example, the return data may include a return identifier for the return, an entity identifier for the entity, a shipping address for the one or more authorized items, descriptions of the one or more authorized items, and/or like. In some embodiments, the return data may be provided exclusively in a computer-readable format that cannot be read by a human to remove any information about the return upfront from the personnel to accomplish the goal of not providing the personnel with any preconceived notion of what the authorized items should look like and/or how manly authorized items are involved with the return. This can allow for the personnel to view the surrendered items provided by the individual in an unbiased manner.

At this point, the individual may surrender the one or more items that are to be returned to the personnel. In turn, the personnel may scan an item identifier for one of the surrendered items via a user computing device 190 being used by the personnel. For example, the item identifier may be a universal product code ("UPC") printed on a label of the surrendered item and the personnel may use a scanning device in communication with the user computing device 190 to send the item identifier to the user computing device 190. As another example, the item identifier may be a QR code printed on packaging or a receipt for the surrendered item and the personnel may use a camera of the user computing device 190 to scan (e.g., read) the QR code. As a result, the process return module 120 receives the item identifier for the surrendered item at Operation 215.

In turn, the process return module 120 verifies that the surrendered item is one of the authorized items associated with the return at Operation 220. In particular embodiments, the process return module 120 performs this operation by executing a conduct verification module 125. The conduct verification module 125 determines whether the item identifier provided for the surrendered item matches a known item identifier for one of the authorized items for the return. Accordingly, at Operation 225, the process return module 120 receives an indication from the conduct verification module 125 whether the surrendered item has been verified as an authorized item for the return.

If the surrendered item has been verified as an authorized item, then the process return module 120 adds a return of the item to a digital return cart at Operation 230. However, if the surrendered item does not have an item identifier or the surrendered item has not been verified as an authorized item, then the process return module 120 executes an image puzzle that assists the personnel is verifying that the surrendered item is an authorized item for the return at Operation 235. In various embodiments, the image puzzle involves a digital display provided on the personnel's user computing device 190 of a set of images that includes images of the authorized items for the return that have yet to be verified as received, as well as images of similar items for the entity that are not involved in the return.

For example, the return may involve two authorized items that are to be returned to the entity and have yet to be verified as received by the personnel. Therefore, the image puzzle may comprise a digital display of six images of items associated with the entity in a matrix format (e.g., 3×3 matrix). Two of the images included in the display may be of the two authorized items for the return, and the remaining four images may be of other items associated with the entity that may be similar types of items as the two authorized items. The image puzzle may request the personnel to select the image found in the puzzle that matches the surrendered item. Accordingly, if the personnel is able to select the image of one of the two authorized items found in the puzzle, then the surrendered item is verified to be one of the authorized items for the return.

In various embodiments, the process return module 120 performs this particular operation by executing an image puzzle module 130. The image puzzle module 130 generates the digital display of the image puzzle and through interaction with the personnel via the image puzzle, verifies that the surrendered item is an authorized item for the return. In turn, the image puzzle module 130 adds a return of the authorized item to the digital return cart upon verifying the surrendered item is the authorized item.

At Operation 240, the process return module 120 determines whether the return involves another authorized item. If so, then the process return module 120 returns to Operation 220 to receive another item identifier for another surrendered item. If all of the surrendered items for the return have been verified, then the process return module 120 submits the return for the individual at Operation 245. In various embodiments, the returns computing system 110 may perform one or more operations in furtherance of processing the return as a result of the return being submitted. For example, the returns computing system 110 may initiate a process to cause the surrendered item(s) to be shipped to the entity. Additionally, or alternatively, the returns computing system 110 may cause a digital credit of a cost (e.g., a refund) of the authorized item(s) to issue to an individual who is associated with the return.

Conduct Verification Module

Figure 3:
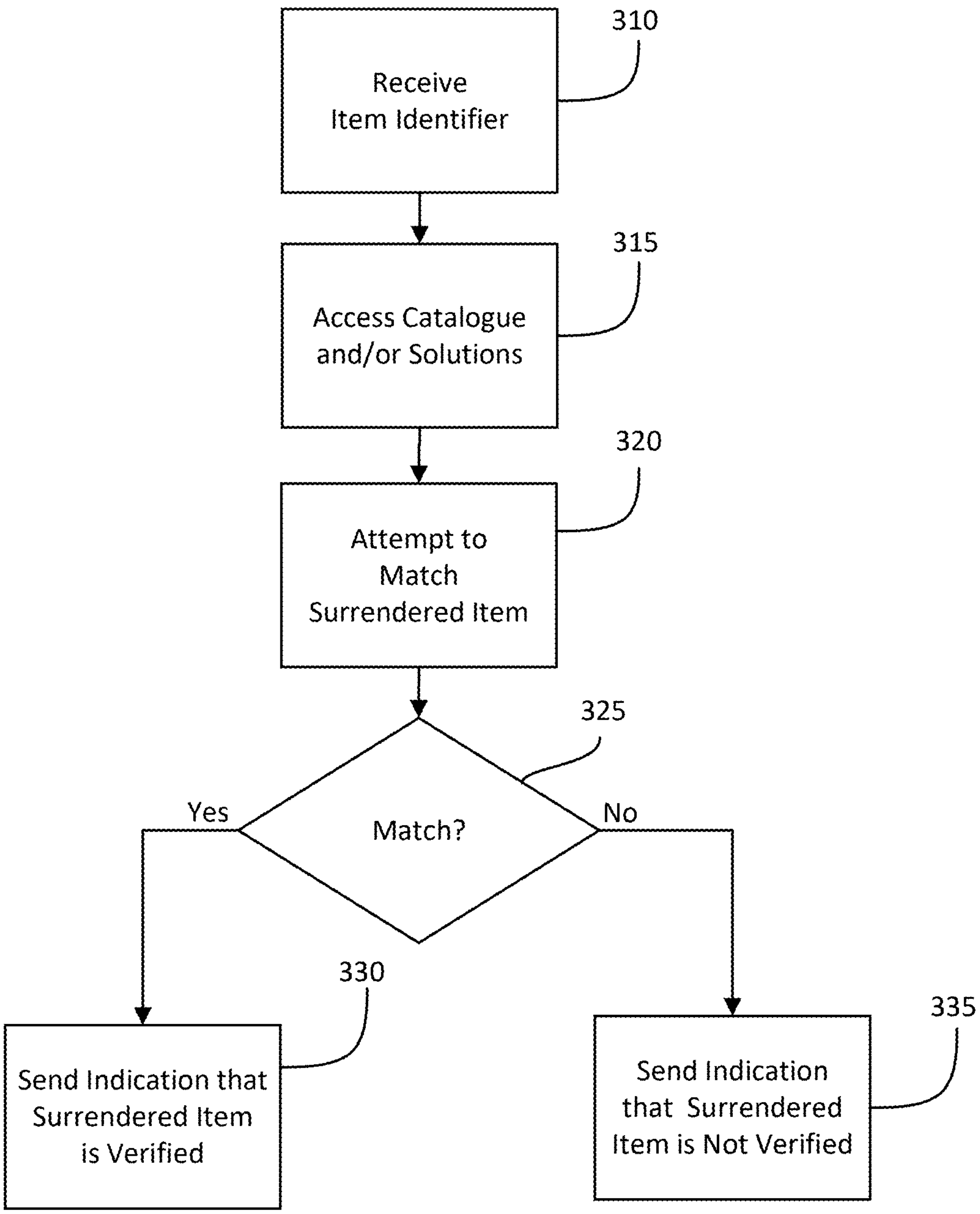
FIG. 3 depicts an example of a process for verifying a surrendered item is an authorized item for a return in accordance with various embodiments of the present disclosure.

Turning now to FIG. 3, additional details are provided regarding a conduct verification module 125 for verifying a surrendered item is an authorized item for a return in accordance with various embodiments of the disclosure. For instance, the flow diagram shown in FIG. 3 may correspond to operations carried out, for example, by computing hardware found in the returns computing system 110 as described herein, as the computing hardware executes the conduct verification module 125.

As previous noted, the conduct verification module 125 may be executed by the process return module 120 in various embodiments to verify a surrendered item is an authorized item for a return being processed by the process return module 120. However, in other embodiments, the conduct verification module 125 may be executed by other modules, and/or execute as a stand-along module.

The process involves the conduct verification module 125 receiving an item identifier for a surrendered item at Operation 310. For example, the process return module 120 may have received the item identifier as a result of personnel for the intermediary scanning computer-readable indicia associated with the surrendered item and in turn, and the process return module 120 may have executed the conduct verification module 125 and provided the conduct verification module 125 with the item identifier as input. In addition, the process return module 120 may have provided the conduct verification module 125 with additional data on the associated return such as, for example, a return identifier, an entity identifier, a link to a digital returns catalogue, and/or the like.

At Operation 315, the conduct verification module 125 accesses a digital items catalogue for the entity. For example, the conduct verification module 125 may identify the digital items catalogue for the entity based at least in part on data provided along with the item identifier, such as an entity identifier and/or a link to the catalogue, and access the digital items catalogue via the data. As another example, the conduct verification module 125 may identify the digital items catalogue for the entity via accessing data stored on the return within the returns computing system 110. Here, the conduct verification module 125 may access the data stored on the return based at least in part on additional data provided along with the item identifier such as, for example, a return identifier, and the data stored on the return may include a digital link to the digital items catalogue that can be used to access the digital items catalogue.

In various embodiments, the conduct verification module 125 uses the digital items catalogue as a data source in recognizing items, as well as corresponding item identifiers, associated with the entity. For example, the items may involve clothing items, and the digital items catalogue for the entity may include a listing of known item identifiers for the clothing items available through (e.g., sold by) the entity, along with additional information on the clothing items such as descriptions of the clothing items, images of the clothing items, costs of the clothing items, applicable seasons (e.g., winter, spring, summer, fall) for the clothing items, and/or the like.

Here, the known item identifiers may comprise some type of identifier that is applied to the clothing item (e.g., label, tag, etc. thereof) and/or packaging for the clothing item such as stock keeping unit ("SKU") code, universal product code ("UPC"), serialized code, product identifier, and/or the like. Additionally, or alternatively, the digital items catalogue for the entity may identify a date for the last time the corresponding clothing item was returned for the entity. As previously noted, the returns computing system 110 may have collected the known item identifiers and/or related information in generating the digital items catalogue for the entity through accessing various sources such as, for example, a data source (e.g., one or more databases) within an entity computing system 180 of the entity that stores such data and/or through collecting item identifiers from various items for the entity that are involved in returns as they are surrendered to the intermediary (personnel thereof) in processing the returns.

In various embodiments, the return computing system 110 may be configured to routinely access the various sources for the entity to update the item identifiers so that the digital items catalogue for the entity reflects the items that are currently available through the entity. For example, the return computing system 110 may access the various sources monthly, weekly, daily, and/or the like. In some embodiments, the return computing system 110 may remove item identifiers for items that are no longer available through the entity and/or are no longer eligible for returns. For example, a source may identify an item as being on final sale and not eligible to be returned. Therefore, the return computing system 110 may determine whether the digital item catalogue for the entity contains an identifier for the item and if so, remove the identifier from the catalogue. As a result, the return computing system 110 can address the challenges of personnel having to stay current with a particular entity's items available for returns.

Additionally, or alternatively, the conduct verification module 125 may retrieve one or more pattern recognition solutions for the entity at Operation 315. As previously noted, a pattern recognition solution may identify a pattern found/recognized within item identifiers for a particular item, particular type of item, particular category of item, and/or the like for the entity. In some embodiments, the returns computing system 110 may, upon receiving a statistically relevant sample size of item identifiers (e.g., a number of samples satisfying a threshold) for the particular item, particular type of item, particular category of item, and/or the like, generate a pattern recognition solution based at least in part on the samples.

For example, the return computing system 110 may receive a particular item identifier for the same item that has been accepted as an authorized item over a period of time, although the item identifier is not found in the digital items catalogue for the entity. Here, the return computing system 110 may generate a pattern recognition solution for the item that indicates the particular item identifier is associated with the item. As another example, the returns computing system 110 may generate a pattern recognition solution for a type of clothing item (e.g., dress shirts) that is available through the entity based on a sample of item identifiers collected for the type of clothing item that indicates the item identifiers for this type of item start with "TCT" and have a total of ten characters. Accordingly, in various embodiments, the conduct verification module 125 may use the one or more pattern recognition solutions as another source in recognizing items, as well as corresponding item identifiers, associated with the entity.

At Operation 320, the conduct verification module 125 attempts to match the surrender item to an authorized item for the return by comparing the item identifier for the surrendered item with the digital items catalogue for the entity. In some embodiments, the conduct verification module 125 performs the comparison by performing a lookup on the digital items catalogue to match the item identifier associated with the surrendered item with a known item identifier for an authorized item involved in the return.

In some embodiments, the conduct verification module 125 may identify the authorized items involved in the return from data provided along with item identifier and/or other data stored on the return within the returns computing system 110. For example, the conduct verification module 125 may have been provided with data along with the item identifier that includes a return identifier for the associate return, and the conduct verification module 125 may use the return identifier in accessing the other data stored on the return within the returns computing system 110. Here, the conduct verification module 125 may determine from the other data that an authorized item for the return is a particular brand of jeans sold by the entity. The conduct verification module 125 may look up the known item identifier for the brand of jeans in the digital items catalogue, and compare the item identifier received for the surrendered item with the known item identifier for the authorized item. If the return involves more than one authorized item, then the conduct verification module 125 may compare the item identifier for the surrendered item with each of the known item identifiers for the authorized items.

Additionally, or alternatively, the conduct verification module 125 may attempt to match the surrender item to an authorized item for the return by evaluating the item identifier for the surrendered item using one or more pattern recognition solutions developed for the entity. For example, the conduct verification module 125 may evaluate the item identifier for the surrendered item using the one or more pattern recognition solutions as a result of the conduct verification module 125 not being able to find an exact match between the item identifier for the surrendered item and a known item identifier for any of the authorized items for the return found in the digital items catalogue for the entity, because a known item identifier for the corresponding authorized item is not available in the digital items catalogue for the entity, and/or because a digital items catalogue is not available at all for the entity.

At Operation 325, the conduct verification module 125 determines whether the surrendered item has been matched to an authorized item for the return. In particular embodiments, the conduct verification module 125 may perform this operation as a tiered process to determine whether a match has been found for the item identifier for the surrendered item. For example, the conduct verification module 125 may initially determine whether the item identifier for the surrendered item matches a known item identifier for one of the authorized items for the return, and therefore the surrendered item is an authorized item for the return.

If conduct verification module 125 cannot find a match, then the conduct verification module 125 may determine whether the item identifier for the surrendered item matches a known item identifier for any item associated with the entity. For example, the conduct verification module 125 may perform a lookup on the digital items catalogue for the entity to determine whether the item identifier for the surrendered item matches any known item identifier provided in the digital items catalogue. Additionally, or alternatively, the conduct verification module 125 may evaluate the item identifier for the surrendered item using one or more pattern recognition solutions for the entity to determine whether the item identifier for the surrendered item resembles a known item identifier for items associated with the entity.

If the conduct verification module 125 determines the item identifier for the surrendered item matches a known item identifier for an item associated with the entity and/or resembles a known item identifier for an item associated with the entity, then the conduct verification module 125 may perform one or more operations to verify the surrendered item is an authorized item for the return. For example, the conduct verification module 125 may provide a message on the personnel's user computing device 190 requesting the personnel to take further action to verify that the surrendered item is an authorized item for the return.

As an illustrative example, the conduct verification module 125 may provide the personnel with instructions to carry out in verifying that the surrendered item is an authorized item for the return. The instructions may request the personnel to ask the individual which of the authorized items for the return is supposed to be the surrendered item. The personnel may provide an answer to the conduct verification module 125 and based at least in part on the answer, the conduct verification module 125 may provide the personnel with a detailed description of the corresponding authorized item so that the personnel can physically verify that the surrendered item is the corresponding authorized item. The personnel may then provide the conduct verification module 125 with a response indicating whether the surrendered item has been verified or not.

If the conduct verification module 125 determines that the item identifier for the surrendered item does not match a known item identifier for an item associated with the entity and/or resembles a known item identifier for an item associated with the entity, then the conduct verification module 125 may determine whether the item identifier for the surrendered item matches a known item identifier for an item associated with another entity. For example, the conduct verification module 125 may perform a lookup on one or more digital items catalogues for other entities to determine whether the item identifier for the surrendered item matches any known item identifier provided in the one or more digital items catalogues for the other entities. Here, for example, the conduct verification module 125 may identify other entities that are associated with (sell) similar types of items as the authorized items for the return, and perform lookups on their corresponding digital items catalogues. Additionally, or alternatively, the conduct verification module 125 may evaluate the item identifier for the surrendered item using one or more pattern recognition solutions for the other entities to determine whether the item identifier for the surrendered item resembles a known item identifier for an item associated with another entity.

If the conduct verification module 125 determines the item identifier for the surrendered item matches a known item identifier for an item associated with another entity and/or resembles a known item identifier for an item associated with another entity, then the conduct verification module 125 may perform one or more operations. For example, the conduct verification module 125 may provide a message on the personnel's user computing device 190 indicating to the personnel that the individual who provided the surrendered item for the return may be attempting to commit fraud by providing a counterfeit item for the authorized item (e.g., the individual may be providing an item associated with another entity that is of lesser/inferior quality for the authorized item). Additionally, or alternatively, the conduct verification module 125 may cancel any further processing of the return and/or may have a communication sent to the entity on the potentially fraudulent return.

If the conduct verification module 125 is able to match the surrendered item to an authorized item for the return, then the conduct verification module 125 sends an indication that the surrendered item has been verified at Operation 330. For example, the conduct verification module 125 may provide an output to the process return module 120 that indicates the surrendered item has been verified as an authorized item for the return.

On the other hand, if the conduct verification module 125 is unable to match the surrendered item to an authorized item for the return, then the conduct verification module 125 sends an indication that the surrendered item has not been verified at Operation 335. For example, the conduct verification module 125 may provide an output to the process return module 120 that indicates the surrendered item has not been verified as an authorized item for the return. In turn, the process return module 120 in particular embodiments may execute the image puzzle module 130, as discussed herein, to attempt to verify the surrendered item is an authorized item for the return.

Image Puzzle Module

Figure 4:
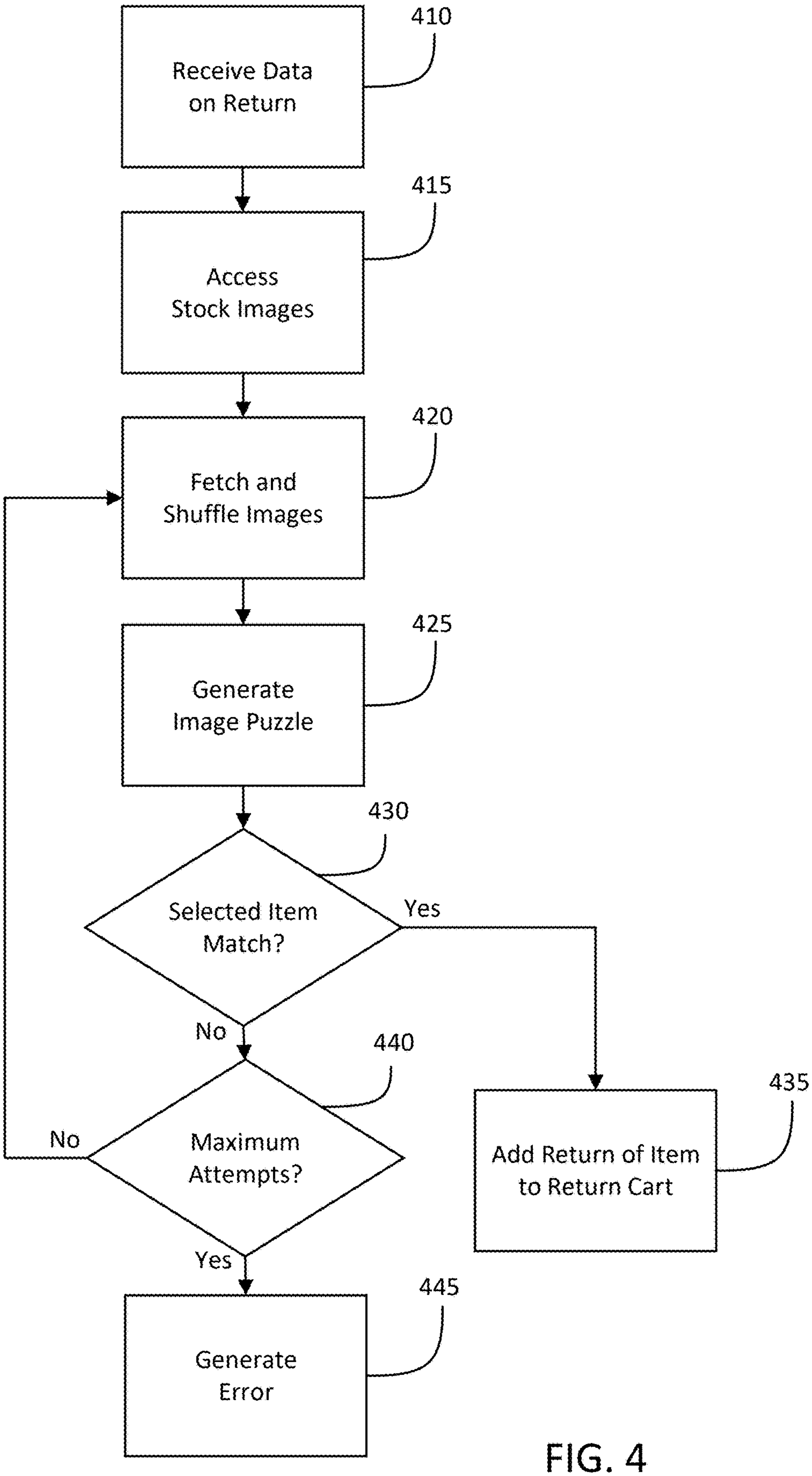
FIG. 4 depicts an example of a process for executing an image puzzle in accordance with various embodiments of the present disclosure.

Turning now to FIG. 4, additional details are provided regarding an image puzzle module 130 for verifying a surrendered item is an authorized item via an image puzzle in accordance with various embodiments of the disclosure. For instance, the flow diagram shown in FIG. 4 may correspond to operations carried out, for example, by computing hardware found in the returns computing system 110 as described herein, as the computing hardware executes the image puzzle module 130.

As previous noted, the image puzzle module 130 may be executed by the process return module 120 in various embodiments to verify a surrendered item is an authorized item for a return being processed by the process return module 120. However, in other embodiments, the image puzzle module 130 may be executed by other modules, and/or execute as a stand-along module.

The process involves the image puzzle module 130 receiving data on the return in Operation 410. For example, the image puzzle module 130 may receive a return identifier for the return. The image puzzle module 130 may use the data on the return in identifying the authorized items for the return. For example, the image puzzle module 130 may use the data on the return (e.g., the return identifier) in accessing data stored for the return within the returns computing system 110. Additionally, or alternatively, the image puzzle module 130 may use the data on the return in accessing a return cart for the return to identify what authorized items been verified as already received (e.g., surrendered) for the return.

At Operation 415, the image puzzle module 130 accesses stock images for items associated with the entity involved in the return. In some embodiments, the stock images may be stored within a digital items catalogue for the entity. Here, the image puzzle module 130 accesses the digital items catalogue for the entity to gain access to the stock images for the items. However, in other embodiments, the image puzzle module 130 may access the stock images for the items from other sources such as a separate database provided within the returns computing system 110 for storing stock images for items associated with different entities. Yet, in other embodiments, the image puzzle module 130 may access the stock images for the items that are available through an entity computing system 180 associated with the entity.

At Operation 420, the image puzzle module 130 fetches and shuffles a set of images from the stock images to use in generating an image puzzle. In various embodiments, the set of images includes an image for each authorized item that has yet to be verified as surrendered for the return, along with images of other items associated with the entity that are not involved in the return. Ideally, the set of images included in the image puzzle should make the image puzzle challenging, but solvable. Therefore, in particular embodiments, the image puzzle module 130 may select the images found in the set of images based at least in part on certain criteria.

For example, the image puzzle module 130 may apply criteria in selecting the images to include in the set of images that involves selecting images of items that have been returned to the entity within a certain period of time (e.g., during the last thirty days). Additionally, or alternatively, the image puzzle module 130 may apply criteria in selecting the images to include in the set of images that involves selecting a set number of images of items that were previously returned to the entity (e.g., images of the last one-hundred items that were previously returned to the entity).

Additionally, or alternatively, the image puzzle module 130 may apply criteria in selecting the images to include in the set of images that involves selecting images of items that are associated with a season that is associated with the authorized items for the return. For example, the authorized items may be clothing items, and the image puzzle module 130 may determine one or more seasons that are applicable to the authorized items are at least one of spring, winter, summer, or fall. The image puzzle module 130 may then select images of items for consideration to include in the set of images for the image puzzle that are also applicable to the same season(s) as applicable to the returned items. The image puzzle module 130 may apply such criteria so that the images of other items included in the image puzzle cannot be easily identified as invalid items for the return. For example, the personnel may be able to easily eliminate an image of a swimsuit in the image puzzle as an invalid item (e.g., as not an authorized item) for the return when the surrendered item being verified is a winter jacket.

Additionally, or alternatively, the image puzzle module 130 may apply criteria in selecting the images to include in the set of images that involves excluding images of certain items. For example, including images of six different black dresses in an image puzzle that is to be used for verifying an authorized item that is a black dress may prove to be too challenging for personnel performing the verification. Therefore, the image puzzle module 130 may exclude images of items that have similar attributes as the authorized items such as, for example, images of items that are the same or similar color as the authorized items, images of items that have the same or similar product names as the authorized items, etc. As another example, the image puzzle module 130 may execute image of items that have been discontinued and are no longer available through the entity.

Additionally, or alternatively, the image puzzle module 130 may apply criteria that involves selecting images of items based at least in part of a number of items to be returned to the entity and/or that still need to be verified for the return. For example, an image puzzle displaying nine images of items may not be desirable when the return involves only a single authorized item that needs to be verified for the return. Likewise, an image puzzle displaying four images of items may not be desirable when three authorized items still need to be verified for the return. Therefore, the image puzzle module 130 may select a certain number of images to include in the set of images based at least in part on the number of items involved in the return and/or the number of items that still need to be verified for the return.

Figure 5A:
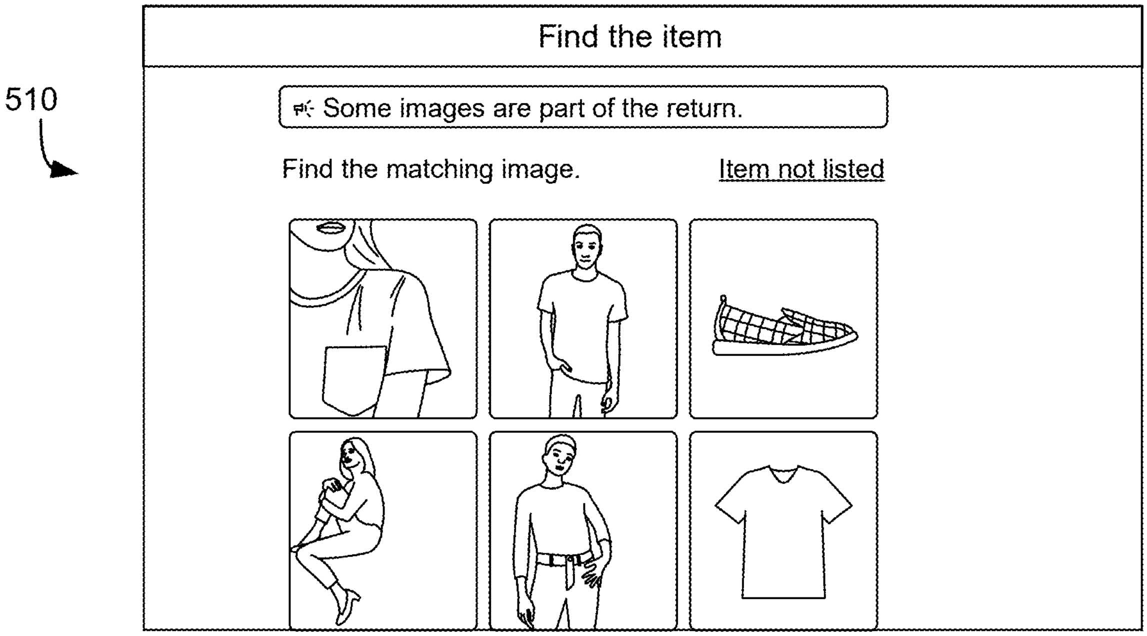
FIGS. 5A and 5B depict examples of image puzzles in accordance with various embodiments of the present disclosure.
Figure 5B:
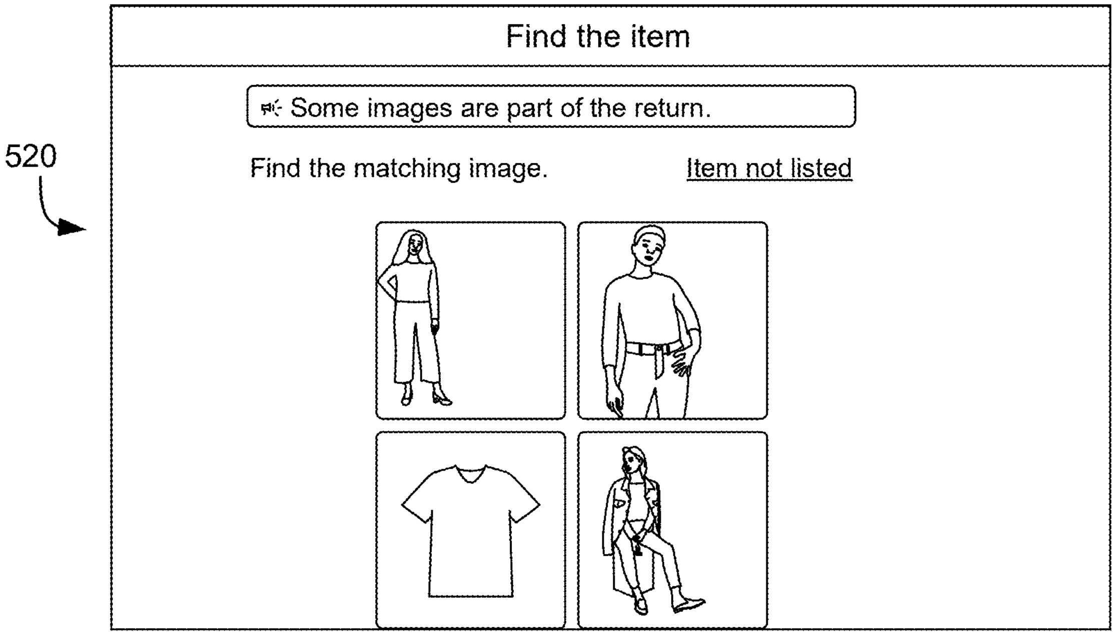

At Operation 425, the image puzzle module 130 generates the image puzzle using the set of images. For example, the set of images may include nine images of items, and the image puzzle module 130 may generate an image puzzle having a layout of a 3×3 matrix. As another example, the set of images may include six images, and the image puzzle module 130 may generate an image puzzle having a layout of a 3×2 matrix. Yet, as another example, the set of images may include four images, and the image puzzle module 130 may generate an image puzzle having a layout of a 2×2 matrix. In addition, the image puzzle module 130 may shuffle the images found in the set of images so that the image of each of the authorized items is randomly placed into any one of the positions of the matrix. Example image puzzles 510, 520 according to various embodiments are shown in FIGS. 5A and 5B.

The image puzzle module 130 then causes display of the image puzzle on a user computing device 190 being used by the personnel. The image puzzle requests the personnel to select the image of an authorized item for the return found in the image puzzle, and the personnel selects the image of the item found in the image puzzle that matches the surrendered item the personnel is attempting to verify as an authorized item for the return.

At Operation 430, the image puzzle module 130 receives the selection and determines whether the personnel selected an image of an authorized item found in the image puzzle. If so, then the image puzzle module 130 verifies that the surrendered item is in fact an authorized item to be returned to the entity. In particular embodiments, the image puzzle module 130 may perform one or more operations as a result of verifying the surrendered item is an authorized item such as, for example, adding a return of the authorized item to a digital return cart at Operation 435.

In various embodiments, if the image puzzle module 130 determines that the personnel has not selected an image of an authorized item, then the image puzzle module 130 determines whether the personnel has reached a maximum number of attempts to select the image of an authorized item at Operation 440. If the maximum number of attempts has not been satisfied, then the image puzzle module 130 returns to Operation 420 to fetch and reshuffle the set of images to use in modifying the display of the image puzzle. For example, the image puzzle module 130 may replace the image of the item that was incorrectly selected by the personnel with an image of another item, and then reshuffle the set of images to modify the display of the image puzzle. The image puzzle module 130 may then cause the modified image puzzle to be displayed to the personnel to provide the personnel with another opportunity to select an image of an authorized item from the set of images shown in the image puzzle.

If image puzzle module 130 determines that the maximum number of attempts to select the image of an authorized item has been satisfied, then the image puzzle module 130 provides the personnel with an error message at Operation 445. Here, the personnel's inability to select the image of an authorized item may signal that the personnel has received an invalid (e.g., a counterfeit) item for the return. Therefore, in particular embodiments, the image puzzle module 130 may provide an error message on the personnel's user computing device 190 indicating to the personnel that the individual who provided the surrendered item for the return may be attempting to commit fraud by providing a counterfeit item for an authorized item (e.g., an item associated with another entity that may be of lesser/inferior quality). Additionally, or alternatively, the image puzzle module 130 may perform additional operations such as, for example, canceling any further processing of the return and/or having a communication sent to the entity on the potentially fraudulent return.

Initiate Return Module

Figure 6:
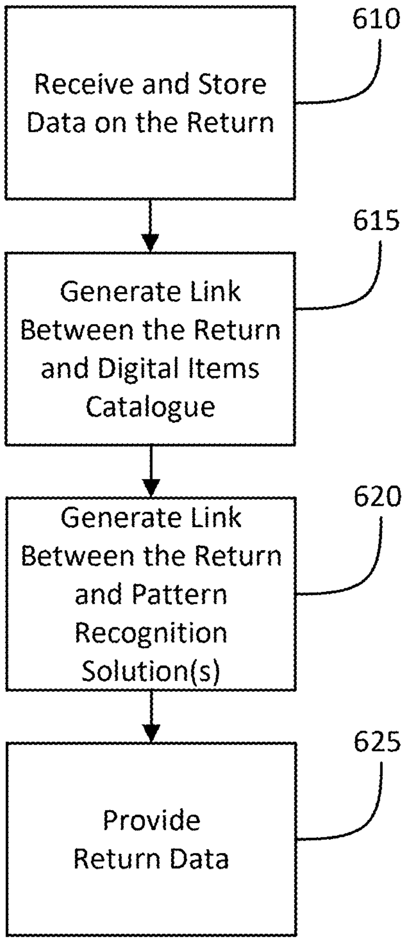
FIG. 6 depicts an example of a process for initiating a return in accordance with various embodiments of the present disclosure.

Turning now to FIG. 6, additional details are provided regarding an initiate return module 135 for initiating a return of one or more authorized items to an entity in accordance with various embodiments of the disclosure. For instance, the flow diagram shown in FIG. 6 may correspond to operations carried out, for example, by computing hardware found in the returns computing system 110 as described herein, as the computing hardware executes the initiate return module 135.

As previous noted, in various embodiments, the returns computing system 110 may provide a returns service through different mechanisms, such as an API 150 and/or interface 160, through which returns can be initiated. For example, an entity computing system 180 may be hosting a website that has the API 150 installed within the website so that the returns service is available to customers (e.g., visitors) who wish to return items purchased on the website and initiate the returns through the intermediary via the returns service. As another example, the returns computing system 110 may provide an interface 160 through which individuals can initiate returns of items for various entities through the intermediary.

An individual who wishes to return one or more items obtained (e.g., purchased) from an entity may visit an interface (e.g., a website of the entity and/or intermediary) and initiate a return for the items. The individual may provide needed data for the return such as a date the items were purchased, a digital receipt for the purchase of the items, a price paid for the items, and/or the like. In turn, the entity (e.g., an entity computing system 180 thereof) and/or the return computing system 110 may process the return and approve the return of the items.

In some embodiments, if the entity computing system 180 is involved, the entity computing system 180 may provide data on the return through the API to the return computing system 110 to store on the return. For example, the entity computing system 180 may provide data the includes descriptions of the authorized items for the return, an entity identifier that identifies the entity, an amount to refund for the return, and/or the like. Additionally, or alternatively, the returns computing system 110 may generate and store data for the return. In doing so, the returns computing system 110 may execute an initiate return module 135 to generate and/or store data on the return within the returns computing system 110 (e.g., within a repository 140 thereof).

The process begins with the initiate return module 135 receiving and storing data on the return at Operation 610. Depending the embodiment, the initiate return module 135 may receive data on the return generated by the entity and/or the intermediary. For example, the entity (e.g., the entity computing system 180) and/or the intermediary (e.g., the returns computing system 110) may provide data on the items that have been authorized for the return. Additionally, or alternatively, the entity and/or intermediary may provide data such as the amount that should be refunded to the individual for the return, a shipping address for returning the items to the entity, a time period in which the return is valid, and/or the like.

At Operation 615, the initiate return module 135 generates a digital link between the return and the applicable digital items catalogue for the entity. Here, the initiate return module 135 may identify the applicable digital items catalogue based at least in part on the data received on the return. For example, the data received for the return may include an entity identifier for the entity involved in the return, and the initiate return module 135 may use the entity identifier in identifying the applicable digital items catalogue for the entity. In addition, the initiate return module 135 may store the digital link along with the data stored for the return within the returns computing system 110.

Accordingly, in particular embodiments, the initiate return module 135 generates and stores the digital link between the return and the applicable digital items catalogue so that the returns computing system 110 (e.g., process return module 120) can use the digital link in quickly accessing the digital items catalogue during a time when the returns computing system 110 is processing the return. Therefore, the returns computing system's use of the digital link can help to improve the system's speed in processing the return, leading to improved optimization and/or scalability of the returns computing system 110.

For similar reasons, the initiate return module 135 generates and stores a digital link between the return and the applicable pattern recognition solution(s) at Operation 620. Additionally, or alternatively, the initiate return module 135 may generate and store similar digital links for other types of data that may be related to the return. For example, the images of the items available from the entity may be stored separately from the digital items catalogue. Therefore, the initiate return module 135 may generate and store a digital link to the images so that the returns computing system 110 (e.g., the image puzzle module 130) can more quickly access the images during processing of the return.

At Operation 625, the initiate return module 135 provides return data that is to be used for processing the return. For example, the return data may include a return identifier associated with the return, the digital links to the digital items catalogue and/or pattern recognition solution(s), and/or the like. In particular embodiments, the initiate return module 135 may embed the return data in computer-readable indicia. In some embodiments, the initiate return module 135 may provide the return data directly to the individual through, for example, an interface 160. In other embodiments, the initiate return module 135 may provide the return data to the entity through, for example, an API 150. In turn, the entity may include additional data in the return data and provide the return data to the individual to use in processing the return. As previously discussed, the individual may then present the return data to personnel of the intermediary to initiate the intermediary processing the return at a time when the individual is surrendering the items for the return.

Example Technical Platforms

Embodiments of the disclosure may utilize various components such as computing systems and/or devices, storage devices, and/or the like, in performing various operations. Accordingly, these components involved in embodiments of the present disclosure may perform instructions that are implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various embodiments are described to use a computer-readable storage medium, other types of computer-readable storage media may be substituted for or used in addition to the computer-readable storage media described above.

Various embodiments of the present disclosure, and/or components thereof and/or that are utilized, may also be implemented as methods, apparatuses, systems, computing devices, computing entities, and/or the like. As such, various embodiments of the present disclosure, and/or components thereof and/or that are utilized, may take the form of a data structure, apparatus, system, computing device, computing entity, and/or the like executing instructions stored on a computer-readable storage medium to perform certain steps or operations. Thus, various embodiments of the present disclosure, and/or components thereof and/or that are utilized, also may take the form of entirely hardware, entirely computer program product, and/or a combination of computer program product and hardware performing certain steps or operations.

Various embodiments of the present disclosure, and/or components thereof and/or that are utilized, are described herein with reference to block diagrams and flowchart illustrations. Thus, each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of embodiments, retrieval, loading, and/or execution may be performed in parallel such that multiple instructions are retrieved, loaded, and/or executed together. Thus, such embodiments can produce specially configured machines performing the steps or operations specified in the block diagrams and flowchart illustrations. Accordingly, the block diagrams and flowchart illustrations support various combinations of embodiments for performing the specified instructions, operations, or steps.

Example System Architecture

Figure 7:
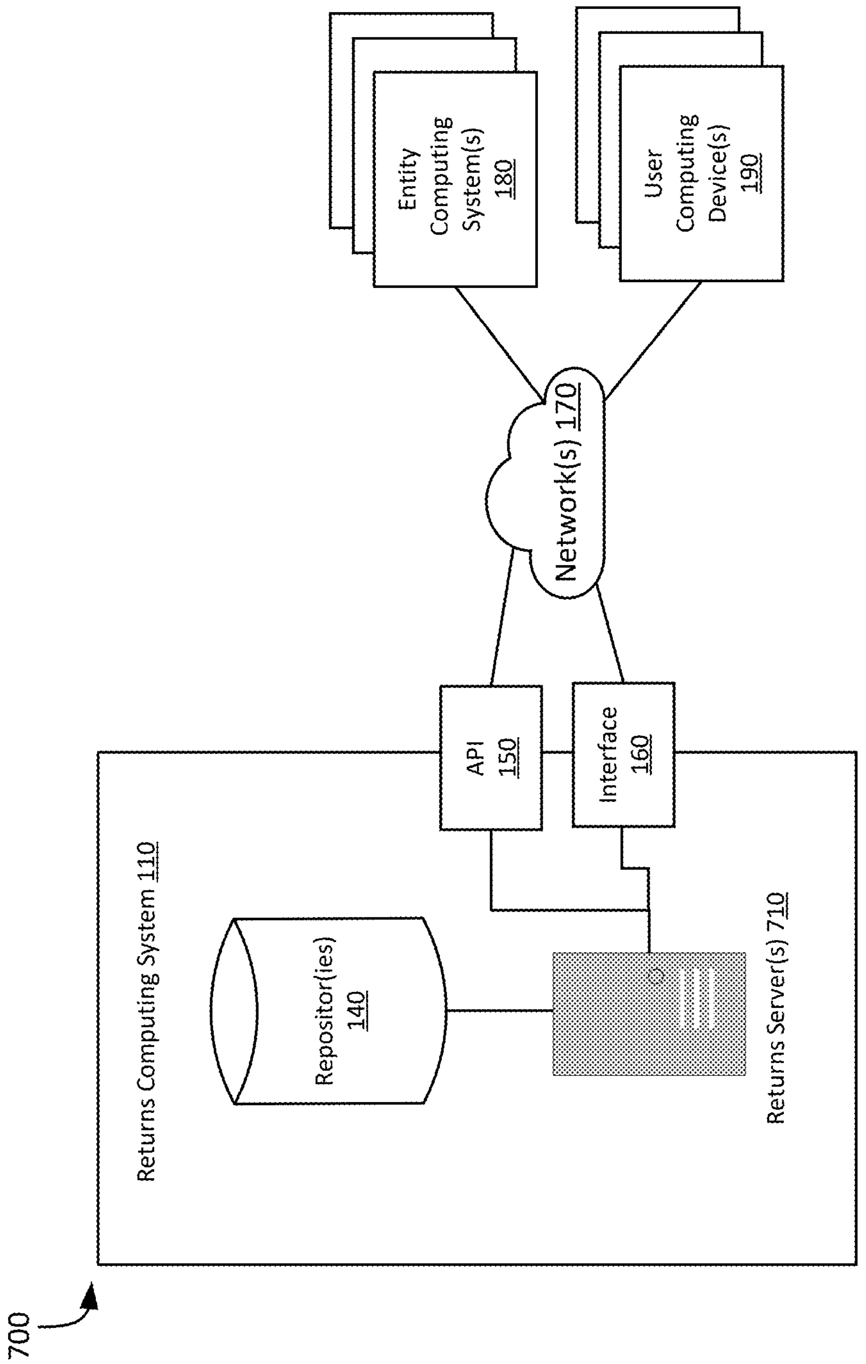
FIG. 7 depicts an example of a computing architecture that may be used in accordance with various embodiments of the present disclosure.

FIG. 7 is a block diagram of a system architecture 700 that can be used in processing one or more items for a return according to various embodiments of the disclosure as detailed herein. Components of the system architecture 70) are configured according to various embodiments to provide functionality configured to initiate returns, process returns, and/or verify surrendered items are authorized items for the returns, through a returns service. As may be understood from FIG. 7, the system architecture 700 in various embodiments may include a returns computing system 110 that comprises one or more returns servers 710 and one or more data repositories 140 to facilitate such functionality.

In particular embodiments, the one or more returns servers 710 and repositories 140 are used as processing capacity and storage in supporting the returns service. For example, the one or more returns servers 710 may execute a process return module 120, a conduct verification module 125, an image puzzle module 130, and/or an initiate return module 135 as described herein in providing functionality for the returns service. In addition, the one or more data repositories 140 may be used for storing programs, data, and/or the like used in supporting the returns service. For example, the one or more data repositories 140 may be used for storing digital items catalogues and/or pattern recognition solutions for various entities as detailed herein. Further, the one or more data repositories 140 may be used for storing data on returns for the different entities that are to be processed through an intermediary.

The one or more return servers 710 may be in communication with one or more entity computing systems 180, as well as one or more user computing devices 190, over one or more networks 170 (e.g., the Internet, cellular, intranet, and/or the like). Accordingly, the returns server(s) 710 may be in communication over the network(s) 170 with components residing on the entity computing systems 180 and/or with the user computing devices 190 to facilitate various functionality as described herein. To do so, the returns server(s) 710 may interface with the entity computing systems 180 via one or more suitable application programming interfaces (APIs) 150, direct connections, and/or the like. In addition, the returns server(s) 710 may interface with the user computing devices 190 via one or more interfaces 160 such as, for example, a Web application, desktop application, mobile application, and/or the like. Although the returns server(s) 710 and data repository(ies) 140 for the returns computing system 110 are shown as separate components, it should be understood that according to other embodiments, these components 710, 140 may comprise a single server and/or repository, a plurality of servers and/or repositories, or any other suitable configuration.

Example Computing Hardware

Figure 8:
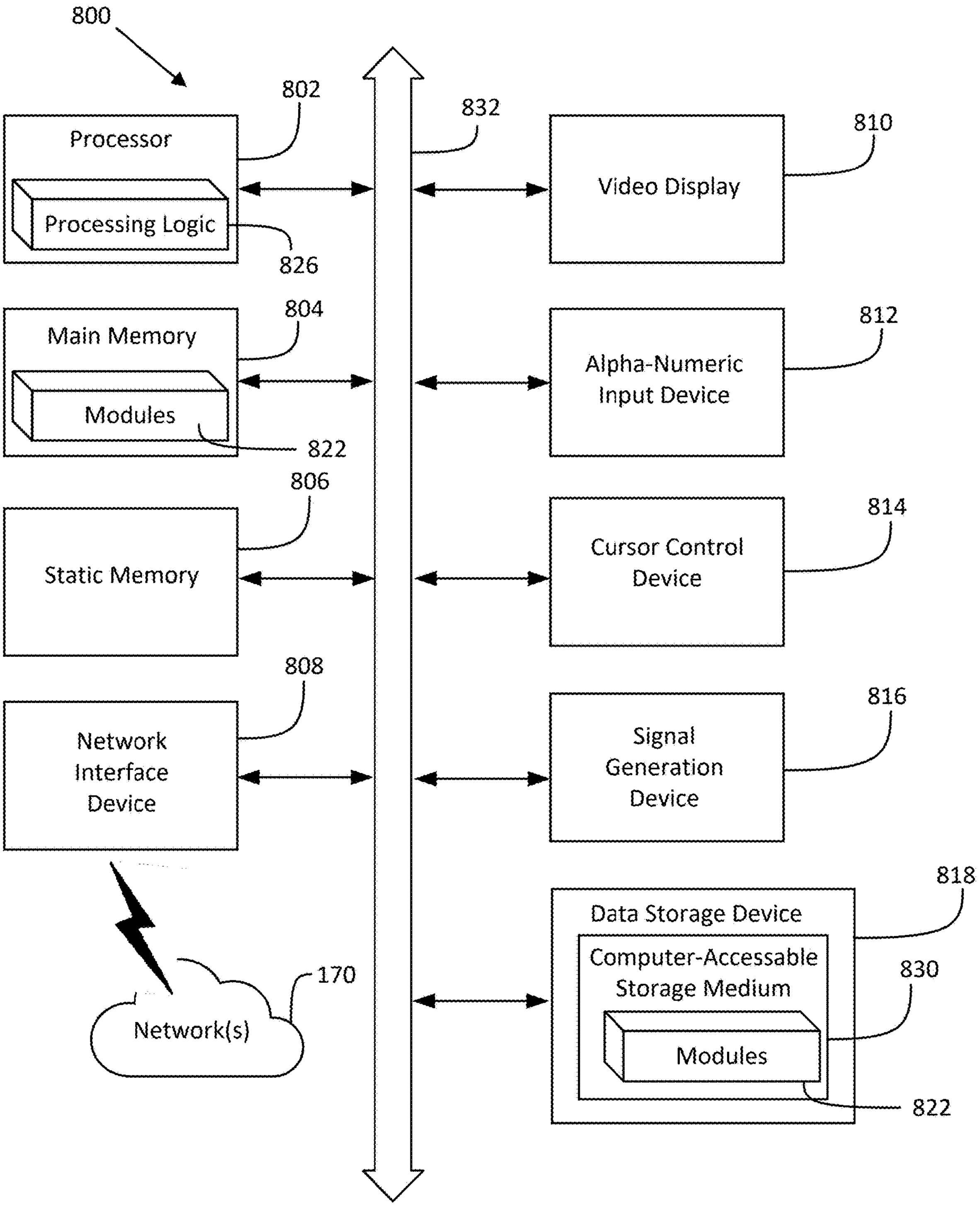
FIG. 8 depicts an example of computing hardware suitable for supporting the operation of various embodiments of the present disclosure.

FIG. 8 illustrates a diagrammatic representation of an example of computing hardware 800 that can be used within the system architecture 700. For example, the computing hardware 800 may be one or more return servers 710 as described in FIG. 7. In various embodiments, the computing hardware 800 may be connected (e.g., networked) to other computing hardware via a wireless network, a LAN, an intranet, an extranet, and/or the Internet. The computing hardware 800 may operate in the capacity of a server, a client computer in a client-server network environment, a peer computer in a peer-to-peer (or distributed) network environment, and/or the like. The computing hardware 800 may be, for example, a desktop personal computer (PC), a tablet PC, a set-top box (STB), a Personal Digital Assistant (PDA), a cellular telephone, a web appliance, a server, a network router, a switch or bridge, or any other computing hardware capable of executing a set of instructions (sequential or otherwise) that specify actions to be taken by the computing hardware 800. Further, while the computing hardware 800 is shown as a single computing entity in FIG. 8, the term "computing hardware" shall also be taken to include any collection of computing entities that individually or jointly execute a set (or multiple sets) of instructions to perform any one or more of the methodologies/functionalities described herein.

The computing hardware 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 832.

The processing device 802 represents one or more general-purpose processing devices such as a microprocessor, a central processing unit, and/or the like. More particularly, the processing device 802 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 may be configured to execute processing logic 826 for performing various operations, steps, and/or the like as discussed herein.

The computing hardware 800 may further include a network interface device 808. The computing hardware 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a non-transitory computer-accessible storage medium 830 (also known as a non-transitory computer-readable storage medium or a non-transitory computer-readable medium) on which is stored one or more modules 822 (e.g., sets of instructions) as described herein. The modules 822 may also reside, completely or at least partially, within the main memory 804 and/or within the processing device 802 during execution thereof by the computing hardware 800. In this capacity, the main memory 804 and the processing device 802 can also constitute computer-accessible storage media. The modules 822 may further be transmitted or received over one or more networks 170 via a network interface device 808.

While the computer-accessible storage medium 830 is shown in FIG. 8 to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a module (e.g., a set of instructions) for execution by the computing hardware 800 and that cause the computing hardware 800 to perform any one or more of the methodologies/functionalities of the present disclosure. The term "computer-accessible storage medium" should accordingly be understood to include, but not be limited to, solid-state memories, optical and magnetic media, etc.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Embodiment 1: A method comprising: receiving, by computing hardware via a scan of a first barcode, return data that identifies an authorized item that is to be returned to an entity; accessing, by the computing hardware and based at least in part on the return data, a digital items catalogue for the entity, wherein the digital items catalogue comprises a data source for recognizing item identifiers for items associated with the entity; receiving, by the computing hardware via a scan of a second barcode associated with a surrendered item, an item identifier for the surrendered item; comparing, by the computing hardware, the item identifier with the digital items catalogue for the entity; determining, by the computing hardware and based at least in part on comparing the item identifier with the digital items catalogue, that the surrendered item cannot be verified as the authorized item that is to be returned to the entity; and responsive to determining that the surrendered item cannot be verified as the authorized item: accessing, by the computing hardware, images of items associated with the entity; fetching, by the computing hardware and from the images of items, a set of images, wherein the set of images comprises an image of the authorized item and images of other items associated with the entity; generating, by the computing hardware and from the set of images, an image puzzle, wherein the image puzzle comprises each of the images found in the set of images; causing, by the computing hardware, display of the image puzzle on a computing device, wherein display of the image puzzle requests a selection of the image of the authorized item found in the image puzzle; receiving, by the computing hardware and from the computing device, the selection of the image of the authorized item found in the image puzzle; verifying, by the computing hardware and based at least in part on receiving the selection of the image of the authorized item, that the surrendered item is the authorized item that is to be returned to the entity; and responsive to verifying that the surrendered item is the authorized item, adding, by the computing hardware, a return of the authorized item to a digital return cart.

Embodiment 2: The method of embodiment 1, wherein fetching the set of images comprises: selecting, from the images of items, images of items that have been returned to the entity within a certain period of time to generate a set of images of returned items; selecting, from the set of images of returned items, images of items associated with a season that is associated with the authorized item to generate a set of images of seasonal items; excluding, from the set of images of seasonal items, images of items having one or more similar attributes with the authorized item to generate a set of images of dissimilar items; and selecting, from the set of images of dissimilar items and based at least in part of a number of items that is to be returned to the entity along with the authorized item, the set of images.

Embodiment 3: The method of embodiment 1 or 2, further comprising, prior to receiving the return data on the authorized item via the scan of the first barcode: receiving, by the computing hardware from a computing system associate with the entity, entity data on the return of the authorized item to the entity; generating, by the computing hardware and based at least in part on the entity data, a first digital link between the return and the digital items catalogue for the entity, wherein retrieving the digital items catalogue for the entity is based at least in part on the first digital link.

Embodiment 4: The method of any of embodiments 1 to 3, wherein the return data identifies a second authorized item that is to be returned to the entity, and the method further comprises: receiving, by the computing hardware via a scan of a third barcode associated with a second surrendered item, a second item identifier for the second surrendered item; comparing, by the computing hardware, the second item identifier with the digital items catalogue for the entity; determining, by the computing hardware and based at least in part on comparing the second item identifier with the digital items catalogue, that the second surrendered item cannot be verified as the second authorized item that is to be returned to the entity; and responsive to determining that the second surrendered item cannot be verified as the second authorized item: updating, by the computing hardware, the set of images to exclude the image of the authorized item to generate an updated set of images, wherein the updated set of images comprises an image of the second authorized item; generating, by the computing hardware and from the updated set of images, an updated image puzzle, wherein the updated image puzzle comprises each of the images found in the updated set of images; causing, by the computing hardware, display of the updated image puzzle on the computing device, wherein display of the updated image puzzle requests a selection of the image of the second authorized item found in the image puzzle; receiving, by the computing hardware and from the computing device, the selection of the image of the second authorized item found in the updated image puzzle; verifying, by the computing hardware and based at least in part on receiving the selection of the image of the second authorized item, that the second surrendered item is the second authorized item that is to be returned to the entity; and responsive to verifying that the second surrendered item is the second authorized item, adding, by the computing hardware, a return of the second authorized item to the digital return cart.

Embodiment 5: The method of any of embodiments 1 to 4, wherein the return data identifies a second authorized item that is to be returned to the entity, and the method further comprises: receiving, by the computing hardware via a scan of a third barcode associated with a second surrendered item, a second item identifier for the second surrendered item; comparing, by the computing hardware, the second item identifier with the digital items catalogue for the entity; verifying, by the computing hardware and based at least in part on comparing the second item identifier with the digital items catalogue, that the second surrendered item is the second authorized item that is to be returned to the entity; and responsive to verifying that the second surrendered item is the second authorized item, adding, by the computing hardware, a return of the second authorized item to the digital return cart.

Embodiment 6: The method of any of embodiments 1 to 5, further comprising submitting, by the computing hardware and based at least in part on the return cart, the return of the authorized item to the entity, wherein submitting the return causes the surrendered item to be shipped to the entity.

Embodiment 7: The method of embodiment 6, wherein submitting the return causes a digital credit to issue to an individual who is associated with the return.

Embodiment 8: A system comprising: a computer-readable medium storing instructions; and a processing device communicatively coupled to the computer-readable medium, wherein the processing device is configured to execute the instructions and thereby perform operations comprising: receiving return data that identifies an authorized item that is to be returned to an entity; accessing, based at least in part on the return data, a digital items catalogue for the entity; receiving an item identifier for a surrendered item; comparing the item identifier with the digital items catalogue for the entity, wherein the digital items catalogue comprises a data source for recognizing item identifiers for items associated with the entity; determining, based at least in part on comparing the item identifier with the digital items catalogue, that the surrendered item cannot be verified as the authorized item that is to be returned to the entity; and responsive to determining that the surrendered item cannot be verified as the authorized item: fetching a set of images, wherein the set of images comprises an image of the authorized item and images of other items associated with the entity; generating, from the set of images, an image puzzle, wherein the image puzzle comprises each of the images found in the set of images; causing display of the image puzzle on a computing device, wherein display of the image puzzle requests a selection of the image of the authorized item found in the image puzzle; receiving, from the computing device, the selection of the image of the authorized item found in the image puzzle; verifying, based at least in part on receiving the selection of the image of the authorized item, that the surrendered item is the authorized item that is to be returned to the entity; and responsive to verifying that the surrendered item is the authorized item, adding a return of the authorized item to a digital return cart.

Embodiment 9: The system of embodiment 8, wherein fetching the set of images comprises: selecting images of items that have been returned to the entity within a certain period of time to generate a set of images of returned items; selecting, from the set of images of returned items, images of items associated with a season that is associated with the authorized item to generate a set of images of seasonal items; excluding, from the set of images of seasonal items, images of items having one or more similar attributes with the authorized item to generate a set of images of dissimilar items; and selecting, from the set of images of dissimilar items and based at least in part of a number of items that is to be returned to the entity along with the authorized item, the set of images.

Embodiment 10: The system of embodiment 9, wherein the season comprises at least one of spring, summer, winter, or fall.

Embodiment 11: The system of embodiment 9, wherein the one or more similar attributes comprise at least one of a color or a product name.

Embodiment 12: The system of any of embodiments 8 to 11, wherein the operations further comprise: receiving a set of item identifiers for a set of the items associated with the entity; determining that the set of item identifiers satisfy a statistical threshold; responsive to determining that the set of item identifiers satisfy the statistical threshold, generating, based at least in part on the set of item identifiers, a pattern recognition solution for the entity, wherein the pattern recognition solution identifies a pattern found within item identifiers for at least one of a particular item, a particular type of item, or a particular category of item for the entity.

Embodiment 13: The system of any of embodiments 8 to 12, wherein the operations further comprise, prior to receiving the return data on the authorized item: receiving, from a computing system associate with the entity, entity data on the return of the authorized item to the entity; generating, based at least in part on the entity data, a first digital link between the return and the digital items catalogue for the entity, wherein retrieving the digital items catalogue for the entity is based at least in part on the first digital link.

Embodiment 14: The system of any of embodiments 8 to 13, wherein the return data identifies a second authorized item that is to be returned to the entity, and the operations further comprise: receiving a second item identifier for a second surrendered item; comparing the second item identifier with the digital items catalogue for the entity; determining, based at least in part on comparing the second item identifier with the digital items catalogue, that the second surrendered item cannot be verified as the second authorized item that is to be returned to the entity; and responsive to determining that the second surrendered item cannot be verified as the second authorized item: updating the set of images to exclude the image of the authorized item to generate an updated set of images, wherein the updated set of images comprises an image of the second authorized item; generating, from the updated set of images, an updated image puzzle, wherein the updated image puzzle comprises each of the images found in the updated set of images; causing display of the updated image puzzle on the computing device, wherein display of the updated image puzzle requests a selection of the image of the second authorized item found in the updated image puzzle; receiving, from the computing device, the selection of the image of the second authorized item found in the updated image puzzle; verifying, based at least in part on receiving the selection of the image of the second authorized item, that the second surrendered item is the second authorized item that is to be returned to the entity; and responsive to verifying that the second surrendered item is the second authorized item, adding a return of the second authorized item to the digital return cart.

Embodiment 15: The system of any of embodiments 8 to 14, wherein the return data identifies a second authorized item that is to be returned to the entity, and the operations further comprise: receiving a second item identifier for a second surrendered item; comparing the second item identifier with the digital items catalogue for the entity; verifying, based at least in part on comparing the second item identifier with the digital items catalogue, that the second surrendered item is the second authorized item that is to be returned to the entity; and responsive to verifying that the second surrendered item is the second authorized item, adding a return of the second authorized item to the digital return cart.

Embodiment 16: A non-transitory computer-readable medium storing computer-executable instructions that, when executed by computing hardware, configure the computing hardware to perform operations comprising: receiving, via a scan of a first barcode, return data that identifies a return, wherein the return involves an authorized item that is to be returned to an entity; accessing, based at least in part on the return data, a digital items catalogue for the entity from a plurality of digital items catalogues for a plurality of entities, wherein each of the plurality of digital items catalogues comprises a data source for recognizing item identifiers for items associated with the corresponding entity from the plurality of entities; receiving, via a scan of a second barcode associated with a surrendered item, an item identifier for the surrendered item; comparing the item identifier with the digital items catalogue for the entity; verifying, based at least in part on comparing the item identifier with the digital items catalogue, that the surrendered item is the authorized item that is to be returned to the entity; and responsive to verifying that the surrendered item is the authorized item, adding a return of the authorized item to a digital return cart.

Embodiment 17: The non-transitory computer-readable medium of embodiment 16, wherein the operations further comprise, for each of the plurality of entities: receiving a set of item identifiers for a set of the items associated with the corresponding entity; determining that the set of item identifiers satisfy a statistical threshold; responsive to determining that the set of item identifiers satisfy the statistical threshold, generating, based at least in part on the set of item identifiers, a pattern recognition solution for the entity, wherein the pattern recognition solution identifies a pattern found within item identifiers for at least one of a particular item, a particular type of item, or a particular category of item for the entity.

Embodiment 18: The non-transitory computer-readable medium of embodiment 17, wherein the return involves a second authorized item that is to be returned to the entity, and the operations further comprise: receiving, via a scan of a third barcode associated with a second surrendered item, a second item identifier for the second surrendered item; evaluating the second item identifier using the pattern recognition solution; verifying, based at least in part on evaluating the second item identifier using the pattern recognition solution, that the second surrendered item is the second authorized item that is to be returned to the entity; and responsive to verifying that the second surrendered item is the second authorized item, adding a return of the second authorized item to the digital return cart.

Embodiment 19: The non-transitory computer-readable medium of any of embodiments 16 to 18, wherein the operations further comprise submitting, based at least in part on the return cart, the return of the authorized item to the entity, wherein submitting the return causes the surrendered item to be shipped to the entity.

Embodiment 20: The non-transitory computer-readable medium of embodiment 19, wherein submitting the return causes a digital credit to issue to an individual who is associated with the return.

CONCLUSION

While this specification contains many specific aspect details, these should not be construed as limitations on the scope of any invention or of what may be claimed, but rather as descriptions of features that may be specific to particular embodiments of particular inventions. Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various embodiments described above should not be understood as requiring such separation in all embodiments, and the described program components (e.g., modules) and systems may be integrated together in a single software product or packaged into multiple software products.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

In some embodiments, this disclosure may include the language "at least one of [element A] or [element B]." This language may refer to one or more of the elements. For example, "at least one of A or B" may refer to "A," "B," or "A and B." In other words, "at least one of A or B" may refer to "at least one of A and at least one of B," "at least A or B," or "A and B." In some embodiments, this disclosure may include the language, for example "[element A], [element B], and/or [element C]." This language may refer to either of the element or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A method comprising:

receiving, by computing hardware via a scan of a first barcode, return data that identifies an authorized item that is to be returned to an entity;

accessing, by the computing hardware and based at least in part on the return data, a digital items catalogue for the entity, wherein the digital items catalogue comprises a data source for recognizing item identifiers for items associated with the entity;

receiving, by the computing hardware via a scan of a second barcode associated with a surrendered item, an item identifier for the surrendered item;

comparing, by the computing hardware, the item identifier with the digital items catalogue for the entity;

determining, by the computing hardware and based at least in part on comparing the item identifier with the digital items catalogue, that the surrendered item cannot be verified as the authorized item that is to be returned to the entity; and responsive to determining that the surrendered item cannot be verified as the authorized item:

accessing, by the computing hardware, images of items associated with the entity;

fetching, by the computing hardware and from the images of items, a set of images, wherein the set of images comprises an image of the authorized item and images of other items associated with the entity;

generating, by the computing hardware and from the set of images, an image puzzle, wherein the image puzzle comprises each of the images found in the set of images;

causing, by the computing hardware, display of the image puzzle on a computing device, wherein display of the image puzzle requests a selection of the image of the authorized item found in the image puzzle;

receiving, by the computing hardware and from the computing device, the selection of the image of the authorized item found in the image puzzle;

verifying, by the computing hardware and based at least in part on receiving the selection of the image of the authorized item, that the surrendered item is the authorized item that is to be returned to the entity; and responsive to verifying that the surrendered item is the authorized item, adding, by the computing hardware, a return of the authorized item to a digital return cart.

2. The method of claim 1, wherein fetching the set of images comprises:

selecting, from the images of items, images of items that have been returned to the entity within a certain period of time to generate a set of images of returned items;

selecting, from the set of images of returned items, images of items associated with a season that is associated with the authorized item to generate a set of images of seasonal items;

excluding, from the set of images of seasonal items, images of items having one or more similar attributes with the authorized item to generate a set of images of dissimilar items; and selecting, from the set of images of dissimilar items and based at least in part on a number of items that is to be returned to the entity along with the authorized item, the set of images.

3. The method of claim 1, further comprising, prior to receiving the return data on the authorized item via the scan of the first barcode:

receiving, by the computing hardware from a computing system associated with the entity, entity data on the return of the authorized item to the entity; and generating, by the computing hardware and based at least in part on the entity data, a first digital link between the return and the digital items catalogue for the entity, wherein retrieving the digital items catalogue for the entity is based at least in part on the first digital link.

4. The method of claim 1, wherein the return data identifies a second authorized item that is to be returned to the entity, and the method further comprises:

receiving, by the computing hardware via a scan of a third barcode associated with a second surrendered item, a second item identifier for the second surrendered item;

comparing, by the computing hardware, the second item identifier with the digital items catalogue for the entity;

determining, by the computing hardware and based at least in part on comparing the second item identifier with the digital items catalogue, that the second surrendered item cannot be verified as the second authorized item that is to be returned to the entity; and responsive to determining that the second surrendered item cannot be verified as the second authorized item:

updating, by the computing hardware, the set of images to exclude the image of the authorized item to generate an updated set of images, wherein the updated set of images comprises an image of the second authorized item;

generating, by the computing hardware and from the updated set of images, an updated image puzzle, wherein the updated image puzzle comprises each of the images found in the updated set of images;

causing, by the computing hardware, display of the updated image puzzle on the computing device, wherein display of the updated image puzzle requests a selection of the image of the second authorized item found in the image puzzle;

receiving, by the computing hardware and from the computing device, the selection of the image of the second authorized item found in the updated image puzzle;

verifying, by the computing hardware and based at least in part on receiving the selection of the image of the second authorized item, that the second surrendered item is the second authorized item that is to be returned to the entity; and responsive to verifying that the second surrendered item is the second authorized item, adding, by the computing hardware, a return of the second authorized item to the digital return cart.

5. The method of claim 1, wherein the return data identifies a second authorized item that is to be returned to the entity, and the method further comprises:

receiving, by the computing hardware via a scan of a third barcode associated with a second surrendered item, a second item identifier for the second surrendered item;

comparing, by the computing hardware, the second item identifier with the digital items catalogue for the entity;

verifying, by the computing hardware and based at least in part on comparing the second item identifier with the digital items catalogue, that the second surrendered item is the second authorized item that is to be returned to the entity; and responsive to verifying that the second surrendered item is the second authorized item, adding, by the computing hardware, a return of the second authorized item to the digital return cart.

6. The method of claim 1, further comprising submitting, by the computing hardware and based at least in part on the digital return cart, the return of the authorized item to the entity, wherein submitting the return causes the surrendered item to be shipped to the entity.

7. The method of claim 6, wherein submitting the return causes a digital credit to issue to an individual who is associated with the return.

8. A system comprising:

a computer-readable medium storing instructions; and a processing device communicatively coupled to the computer-readable medium, wherein the processing device is configured to execute the instructions and thereby perform operations comprising:

receiving return data that identifies an authorized item that is to be returned to an entity;

accessing, based at least in part on the return data, a digital items catalogue for the entity;

receiving an item identifier for a surrendered item;

comparing the item identifier with the digital items catalogue for the entity, wherein the digital items catalogue comprises a data source for recognizing item identifiers for items associated with the entity;

determining, based at least in part on comparing the item identifier with the digital items catalogue, that the surrendered item cannot be verified as the authorized item that is to be returned to the entity; and responsive to determining that the surrendered item cannot be verified as the authorized item:

fetching a set of images, wherein the set of images comprises an image of the authorized item and images of other items associated with the entity;

generating, from the set of images, an image puzzle, wherein the image puzzle comprises each of the images found in the set of images;

causing display of the image puzzle on a computing device, wherein display of the image puzzle requests a selection of the image of the authorized item found in the image puzzle;

receiving, from the computing device, the selection of the image of the authorized item found in the image puzzle;

verifying, based at least in part on receiving the selection of the image of the authorized item, that the surrendered item is the authorized item that is to be returned to the entity; and responsive to verifying that the surrendered item is the authorized item, adding a return of the authorized item to a digital return cart.

9. The system of claim 8, wherein fetching the set of images comprises:

selecting images of items that have been returned to the entity within a certain period of time to generate a set of images of returned items;

selecting, from the set of images of returned items, images of items associated with a season that is associated with the authorized item to generate a set of images of seasonal items;

excluding, from the set of images of seasonal items, images of items having one or more similar attributes with the authorized item to generate a set of images of dissimilar items; and selecting, from the set of images of dissimilar items and based at least in part on a number of items that is to be returned to the entity along with the authorized item, the set of images.

10. The system of claim 9, wherein the season comprises at least one of spring, summer, winter, or fall.

11. The system of claim 9, wherein the one or more similar attributes comprise at least one of a color or a product name.

12. The system of claim 8, wherein the operations further comprise:

receiving a set of item identifiers for a set of the items associated with the entity;

determining that the set of item identifiers satisfy a statistical threshold; and responsive to determining that the set of item identifiers satisfy the statistical threshold, generating, based at least in part on the set of item identifiers, a pattern recognition solution for the entity, wherein the pattern recognition solution identifies a pattern found within item identifiers for at least one of a particular item, a particular type of item, or a particular category of item for the entity.

13. The system of claim 8, wherein the operations further comprise, prior to receiving the return data on the authorized item:

receiving, from a computing system associated with the entity, entity data on the return of the authorized item to the entity; and generating, based at least in part on the entity data, a first digital link between the return and the digital items catalogue for the entity, wherein retrieving the digital items catalogue for the entity is based at least in part on the first digital link.

14. The system of claim 8, wherein the return data identifies a second authorized item that is to be returned to the entity, and the operations further comprise:

receiving a second item identifier for a second surrendered item;

comparing the second item identifier with the digital items catalogue for the entity;

determining, based at least in part on comparing the second item identifier with the digital items catalogue, that the second surrendered item cannot be verified as the second authorized item that is to be returned to the entity; and responsive to determining that the second surrendered item cannot be verified as the second authorized item:

updating the set of images to exclude the image of the authorized item to generate an updated set of images, wherein the updated set of images comprises an image of the second authorized item;

generating, from the updated set of images, an updated image puzzle, wherein the updated image puzzle comprises each of the images found in the updated set of images;

causing display of the updated image puzzle on the computing device, wherein display of the updated image puzzle requests a selection of the image of the second authorized item found in the updated image puzzle;

receiving, from the computing device, the selection of the image of the second authorized item found in the updated image puzzle;

verifying, based at least in part on receiving the selection of the image of the second authorized item, that the second surrendered item is the second authorized item that is to be returned to the entity; and responsive to verifying that the second surrendered item is the second authorized item, adding a return of the second authorized item to the digital return cart.

15. The system of claim 8, wherein the return data identifies a second authorized item that is to be returned to the entity, and the operations further comprise:

receiving a second item identifier for a second surrendered item;

comparing the second item identifier with the digital items catalogue for the entity;

verifying, based at least in part on comparing the second item identifier with the digital items catalogue, that the second surrendered item is the second authorized item that is to be returned to the entity; and responsive to verifying that the second surrendered item is the second authorized item, adding a return of the second authorized item to the digital return cart.

* * * * *